US012774797B2

(12) United States Patent
Lee et al.

(10) Patent No.: US 12,774,797 B2
(45) Date of Patent: *Oct. 27, 2026

(54) LIGHTING MODULE AND LIGHTING DEVICE PROVIDED WITH SAME

(71) Applicant: LG INNOTEK CO., LTD., Seoul (KR)

(72) Inventors: Dong Hyun Lee, Seoul (KR); Kwang Hyun Ko, Seoul (KR); Kyoung Soo Ahn, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/976,585

(22) Filed: Dec. 11, 2024

(65) Prior Publication Data

US 2025/0102128 A1 Mar. 27, 2025

Related U.S. Application Data

(63) Continuation of application No. 18/661,848, filed on May 13, 2024, now Pat. No. 12,203,627, which is a (Continued)

(30) Foreign Application Priority Data

Jun. 4, 2019 (KR) ........................ 10-2019-0065936
Dec. 12, 2019 (KR) ........................ 10-2019-0166057

(51) Int. Cl.
*F21S 43/20* (2018.01)
*F21S 43/31* (2018.01)

(52) U.S. Cl.
CPC ............. *F21S 43/26* (2018.01); *F21S 43/255* (2018.01); *F21S 43/2605* (2024.05); *F21S 43/31* (2018.01)

(58) Field of Classification Search
CPC .......... F21S 43/26; F21S 43/255; F21S 43/31; F21S 43/2605
See application file for complete search history.

(56) References Cited

U.S. PATENT DOCUMENTS 5,249,104 A 9/1993 Mizobe
5,580,165 A 12/1996 Natsume et al.
(Continued)

FOREIGN PATENT DOCUMENTS

CN 104508351 4/2015
CN 104633531 5/2015
(Continued)

OTHER PUBLICATIONS

Japanese Office Action dated Aug. 19, 2025 issued in Application No. 2024-219685.
(Continued)

*Primary Examiner* — Matthew J. Peerce
(74) *Attorney, Agent, or Firm* — KED & ASSOCIATES, LLP

(57) ABSTRACT

A lighting device disclosed in an embodiment of the invention includes a substrate; a plurality of light sources disposed on the substrate; a resin layer covering the light source on the substrate; a light blocking layer having an opening portion on the resin layer; and a lens plate disposed on the light blocking layer, wherein the lens plate includes a light transmitting portion and a convex portion arranged on one surface or the other surface of the light transmitting portion, and the total area of the opening portions is 50% or less of an area of an emission surface through which light is emitted through the resin layer, and the interval between the lens plate and the light blocking layer may be greater than the length of the opening portion.

14 Claims, 19 Drawing Sheets

Related U.S. Application Data continuation of application No. 18/229,827, filed on Aug. 3, 2023, now Pat. No. 12,018,812, which is a continuation of application No. 17/616,323, filed as application No. PCT/KR2020/007095 on Jun. 1, 2020, now Pat. No. 11,754,252.

(56) References Cited

U.S. PATENT DOCUMENTS

| | | | | |
|---|---|---|---|---|
| 6,151,062 | A | 11/2000 | Inoguchi et al. | |
| 8,113,695 | B2 | 2/2012 | Meinke | |
| 8,721,149 | B2 * | 5/2014 | Holman | G02B 6/0061 362/628 |
| 8,960,977 | B2 * | 2/2015 | Yang | F21S 43/28135 362/617 |
| 9,207,393 | B2 | 12/2015 | Yang et al. | |
| 9,312,458 | B2 | 4/2016 | Park et al. | |
| 9,494,727 | B2 | 11/2016 | Kim et al. | |
| 9,541,696 | B2 | 1/2017 | Yang et al. | |
| 9,644,813 | B2 | 5/2017 | Yang et al. | |
| 9,651,205 | B2 | 5/2017 | Yamamoto et al. | |
| 9,658,475 | B2 | 5/2017 | Kim et al. | |
| 9,733,417 | B2 | 8/2017 | Jang et al. | |
| 9,813,696 | B2 * | 11/2017 | Jang | H04N 13/305 |
| 10,228,504 | B2 | 3/2019 | Yang et al. | |
| 10,288,255 | B2 | 5/2019 | Tsai et al. | |
| 10,379,283 | B2 | 8/2019 | Jang et al. | |
| 10,436,404 | B2 | 10/2019 | Lee et al. | |
| 10,527,250 | B2 | 1/2020 | Cho et al. | |
| 10,578,272 | B2 | 3/2020 | Nykerk et al. | |
| 10,670,794 | B2 | 6/2020 | Yang et al. | |
| 10,907,790 | B2 | 2/2021 | Cho et al. | |
| 10,935,199 | B2 | 3/2021 | Jang et al. | |
| 11,333,314 | B2 | 5/2022 | Cho et al. | |
| 11,754,252 | B2 | 9/2023 | Lee et al. | |
| 12,018,812 | B2 | 6/2024 | Lee et al. | |
| 12,203,627 | B2 | 1/2025 | Lee et al. | |
| 2011/0050558 | A1 * | 3/2011 | Park | G02F 1/133606 362/235 |
| 2013/0003410 | A1 | 1/2013 | Kim et al. | |
| 2013/0328090 | A1 | 12/2013 | Park et al. | |
| 2013/0335994 | A1 * | 12/2013 | Mulder | B60Q 1/325 362/555 |
| 2014/0043819 | A1 | 2/2014 | Yang et al. | |
| 2014/0043854 | A1 | 2/2014 | Yang et al. | |
| 2015/0109817 | A1 | 4/2015 | Yang et al. | |
| 2015/0131314 | A1 | 5/2015 | Chang | |
| 2015/0176773 | A1 | 6/2015 | Yamamoto et al. | |
| 2015/0346422 | A1 | 12/2015 | Jang et al. | |
| 2016/0076730 | A1 | 3/2016 | Yang et al. | |
| 2016/0076738 | A1 | 3/2016 | Hsueh et al. | |
| 2017/0075054 | A1 | 3/2017 | Yang et al. | |
| 2017/0227183 | A1 | 8/2017 | Cho et al. | |
| 2017/0293069 | A1 | 10/2017 | Jang et al. | |
| 2017/0314759 | A1 | 11/2017 | Nykerk et al. | |
| 2018/0149325 | A1 | 5/2018 | Lee et al. | |
| 2018/0149336 | A1 | 5/2018 | Tsai et al. | |
| 2019/0146138 | A1 | 5/2019 | Yang et al. | |
| 2019/0317269 | A1 | 10/2019 | Jang et al. | |
| 2020/0149700 | A1 | 5/2020 | Cho et al. | |
| 2021/0123579 | A1 | 4/2021 | Cho et al. | |
| 2022/0235913 | A1 | 7/2022 | Lee | |
| 2022/0308356 | A1 | 9/2022 | Makinen | |
| 2023/0375151 | A1 | 11/2023 | Lee et al. | |
| 2024/0295302 | A1 | 9/2024 | Lee et al. | |
| 2025/0102128 | A1 | 3/2025 | Lee et al. | |

FOREIGN PATENT DOCUMENTS

| | | |
|---|---|---|
| CN | 107683387 | 2/2018 |
| CN | 108131639 | 6/2018 |
| CN | 114127470 | 3/2022 |
| EP | 0859525 | 8/1998 |
| EP | 2677556 | 12/2013 |
| EP | 2696135 | 12/2014 |
| EP | 3211290 | 8/2017 |
| JP | 2008-076783 | 4/2008 |
| JP | 2009-008912 | 1/2009 |
| JP | 2013-524292 | 6/2013 |
| JP | 2014-038845 | 2/2014 |
| JP | 2017-518615 | 7/2017 |
| JP | 2018518033 | 7/2018 |
| KR | 10-2015-0092796 | 8/2015 |
| KR | 10-2016-0139274 | 12/2016 |
| TW | 200304579 | 10/2003 |
| WO | WO 2015/186931 | 12/2015 |

OTHER PUBLICATIONS

Chinese Office Action dated Apr. 25, 2023 issued in Application No. 202080051213.0.
European Search Report dated May 8, 2023 issued in Application No. 20818360.8.
International Search Report dated Sep. 9, 2020 issued in Application No. PCT/KR2020/007095.
U.S. Notice of Allowance dated May 10, 2023 issued in U.S. Appl. No. 17/616,323.
U.S. Notice of Allowance dated Feb. 15, 2024 issued in U.S. Appl. No. 18/229,827.
Japanese Office Action dated May 14, 2024 issued in Application No. 2021-572520.
U.S. Notice of Allowance dated Oct. 9, 2024 issued in U.S. Appl. No. 18/661,848.
Chinese Office Action dated Mar. 11, 2026 issued in Application No. 202410060710.7.

* cited by examiner

LIGHTING MODULE AND LIGHTING DEVICE PROVIDED WITH SAME

CROSS-REFERENCE TO RELATED PATENT APPLICATIONS

This application is a Continuation of U.S. patent application Ser. No. 18/661,848, filed May 13, 2024, which is a Continuation of U.S. patent application Ser. No. 18/229,827, filed Aug. 3, 2023, now U.S. Pat. No. 12,018,812, which is a Continuation of U.S. patent application Ser. No. 17/616,323, filed Dec. 3, 2021, now U.S. Pat. No. 11,754,252, which is a U.S. National Stage Application under 35 U.S.C. § 371 of PCT Application No. PCT/KR2020/007095, filed Jun. 1, 2020, which claims priority to Korean Patent Application Nos. 10-2019-0065936, filed Jun. 4, 2019 and 10-2019-0166057, filed Dec. 12, 2019, whose entire disclosures are hereby incorporated by reference.

TECHNICAL FIELD

An embodiment of the invention relates to a lighting module and a lighting device having a plurality of light sources. An embodiment of the invention relates to a lighting module, a lighting device, or a vehicle lamp providing three-dimensional lighting.

BACKGROUND ART

Lighting applications include vehicle lights as well as backlights for displays and signs. Light emitting device, such as light emitting diode (LED), have advantages such as low power consumption, semi-permanent life, fast response speed, safety, and environmental friendliness compared to conventional light sources such as fluorescent lamps and incandescent lamps. These light emitting diodes are applied to various display devices, various lighting devices such as indoor or outdoor lights. Recently, as a vehicle light source, a lamp employing a light emitting diode has been proposed. Compared with incandescent lamps, light emitting diodes are advantageous in that power consumption is small. However, the light emitting diode emits light in the form of a point light source and each individual image of three-dimensional lighting is matched with one light emitting diode, and a plurality of light emitting diodes are required to implement all of the plurality of individual images. In addition, when the light emitting diodes are used identically to each other, since the widths of individual images of stereoscopic lighting are the same, there is a problem in that diversity of images cannot be expressed. For this reason, when a light emitting diode is used as a vehicle lamp, there is a demand for reducing the number of light emitting diodes and realizing various images.

DISCLOSURE

Technical Problem

An embodiment of the invention provides a lighting module or a lighting device having an opening portion in an emission surface. A plurality of opening portions to the emission surface and a point light source of uniform intensity through the plurality of opening portions may be provided, and the point light source emitted through the opening portion may be provided as a three-dimensional surface lighting or a stereoscopic image. An embodiment of the invention provides a lighting module or lighting device for irradiating one or a plurality of stereoscopic images. An embodiment of the invention provides a lighting module or lighting device for irradiating the same or different stereoscopic images. An embodiment of the invention may provide a light unit, a display device, or a vehicle lamp having the lighting module.

Technical Solution

A lighting device according to an embodiment of the invention includes a substrate; a plurality of light sources disposed on the substrate; a resin layer covering the light source on the substrate; a light blocking layer having at least one opening portion on the resin layer; and a lens plate disposed on the light blocking layer, wherein the lens plate includes a light transmitting portion and a plurality of convex portions arranged on one or the other surface of the light transmitting portion, and the total area of the opening portion is 50% or less of an area of the emission surface from which light is emitted through the resin layer, and an interval between the lens plate and the light blocking layer may be greater than a length of the opening portion. According to an embodiment of the invention, a single or a plurality of light transmitting layers may be included between the resin layer and the light blocking layer, and the single or plurality of light transmitting layers may include at least one of a diffusion agent, a phosphor, and ink particles. According to an embodiment of the invention, the light blocking layer is in contact with a surface of the light transmitting layer, the opening portion provides a surface lighting to the lens plate, and the total area of the opening portion may be in a range of 1% to 25% of the upper surface area of the resin layer. A plurality of the convex portions is arranged in a first direction, each of the plurality of convex portions has a long length in a second direction orthogonal to the first direction, and the maximum width of each of the plurality of convex portions in the first direction may be greater than a height of each of the plurality of convex portions. The convex portion may have a hemispherical shape or a polygonal shape, and the opening portion may have a circular shape, an elliptical shape, or a polygonal shape. At least a portion of the lens plate may be inclined or tilted at a predetermined angle with respect to the light blocking layer with respect to the first direction or the second direction. The lens plate may be rotated at a predetermined angle with respect to a vertical axis. A first reflective layer may be disposed between the substrate and the resin layer. The convex portion may include a lenticular lens, and the light passing through the lens plate may be illuminated by three-dimensional surface lighting or a stereoscopic image.

ADVANTAGEOUS EFFECTS

According to an embodiment of the invention, it is possible to implement a lighting device having a stereoscopic effect through one or a plurality of regions. A lighting device having the same or different stereoscopic images may be implemented. By tilting or rotating the stereoscopic surface lighting, various types of stereoscopic effects may be provided. Accordingly, it is possible to reduce the thickness of the lighting device or module that may give a stereoscopic effect. In addition, a flexible lighting module or lighting device may be implemented, and optical reliability may be improved. The reliability of a vehicle lighting device having the lighting module may be improved, and may be applied to a light unit, various display devices, a surface light source lighting device, or a vehicle lamp.

BEST MODE

Mode for Invention

Figure 1:
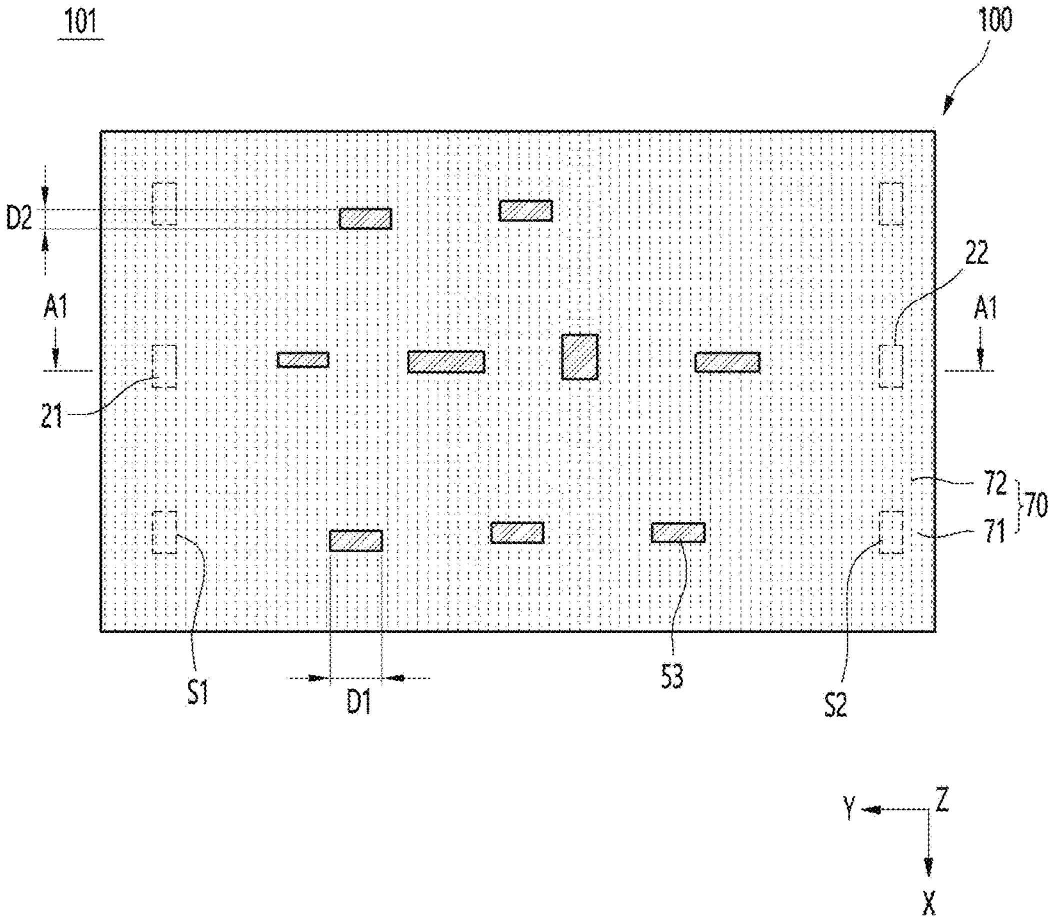
FIG. 1 is a plan view showing a lighting device according to a first embodiment of the invention.

Hereinafter, with reference to the accompanying drawings will be described in detail preferred embodiments that may be easily carried out by the person of ordinary skill in the art. However, it should be understood that the configurations shown in the embodiments and drawings described in this specification are only preferred embodiments of the invention, and that there may be various equivalents and modifications that can replace them at the time of application. In the detailed description of the operating principle for the preferred embodiment of the invention, when it is determined that a detailed description of related known functions or configurations may unnecessarily obscure the subject matter of the invention, the detailed description will be omitted. Terms to be described later are terms defined in consideration of functions in the invention, and the meaning of each term should be interpreted based on the contents throughout the present specification. The same reference numerals are used for parts having similar functions and functions throughout the drawings. Hereinafter, the embodiments will be apparent through the description of the accompanying drawings and embodiments. In the description of the embodiments, each layer (film), region, pattern or structure is formed "on" or "under" of the substrate, each layer (film), region, pad or patterns. In the case described as, "on" and "under" include both "directly" or "indirectly" formed through another layer. In addition, the criteria for the top or bottom of each layer will be described based on the drawings.

First Embodiment

Figure 2:
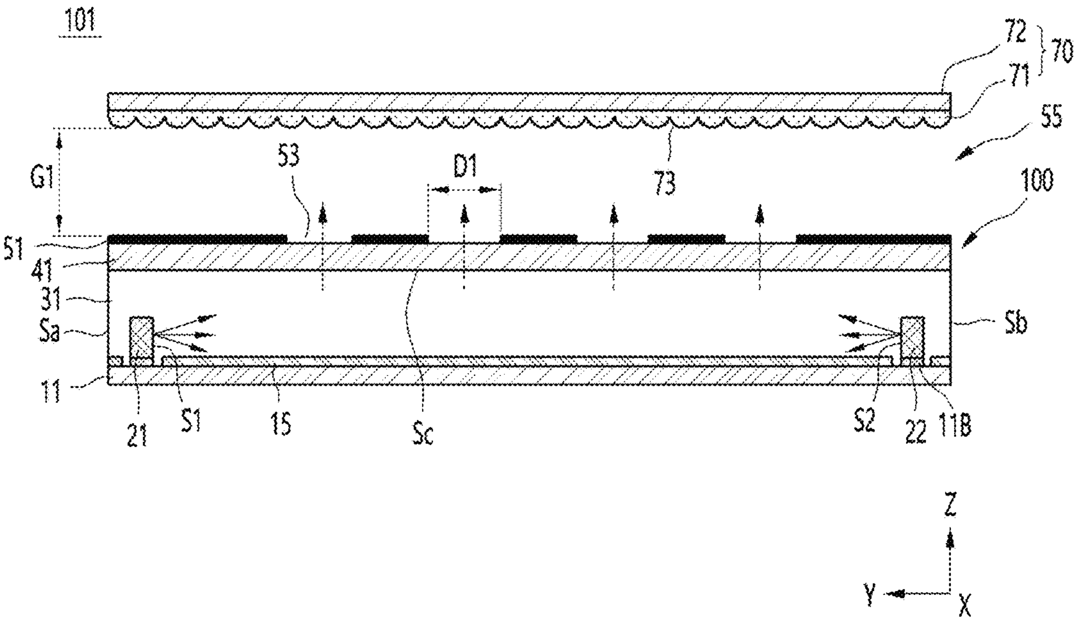
FIG. 2 is an example of a cross-sectional view on the side A1-A1 of the lighting device of FIG. 1.
Figure 3:
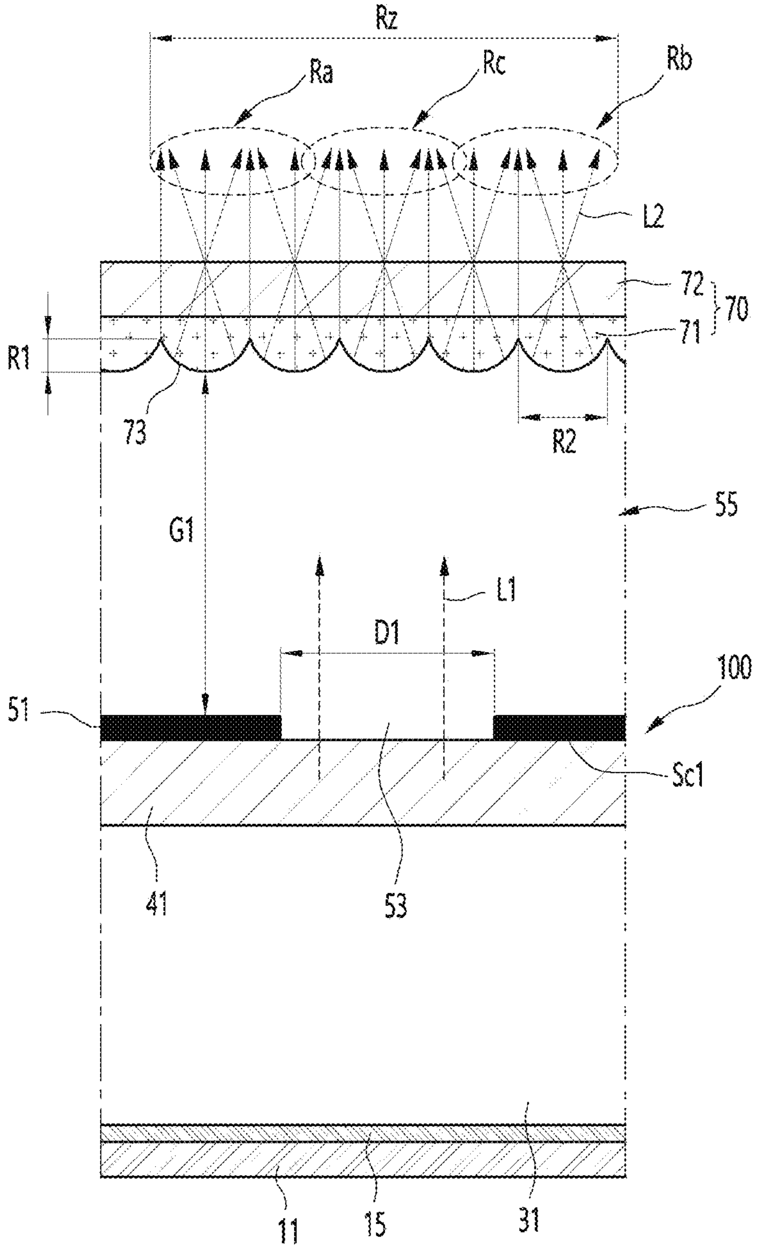
FIG. 3 is a view for explaining a stereoscopic effect in the lighting device of FIG. 2.
Figure 4:
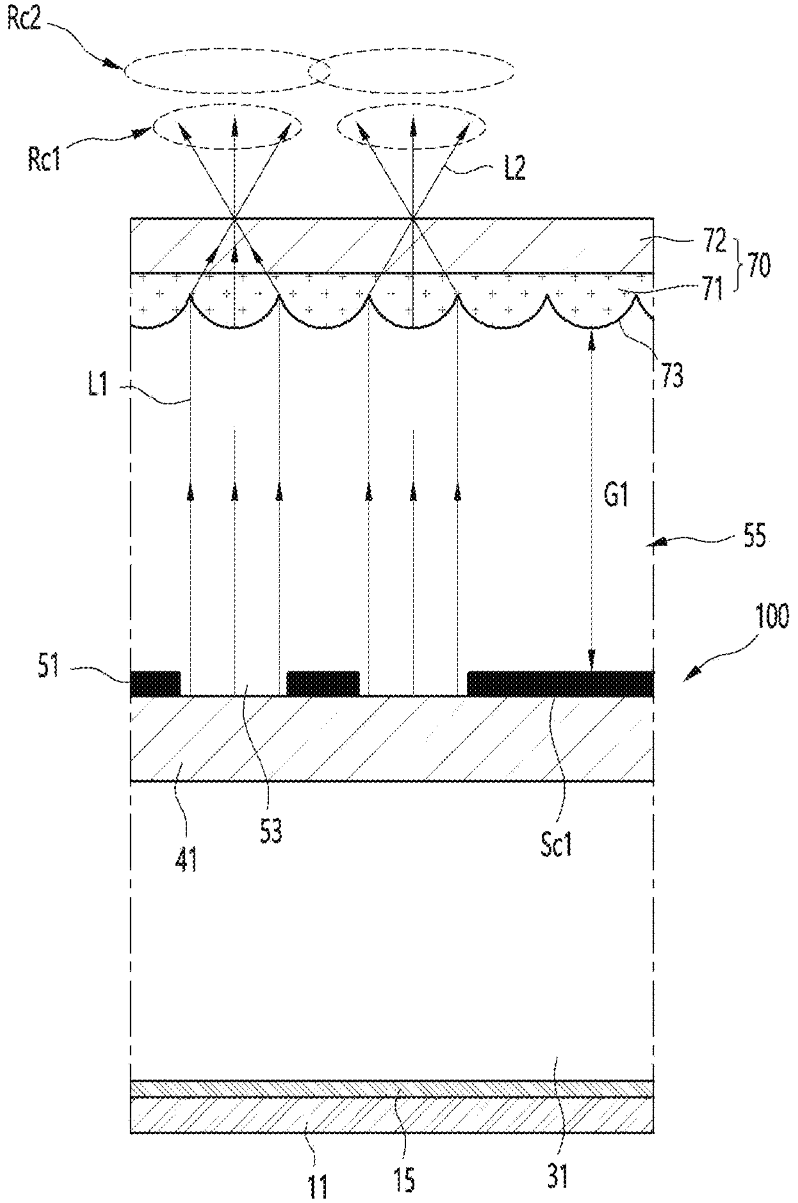
FIG. 4 is a view for explaining an example of adjusting the size of a stereoscopic image according to an interval between a lens plate and a lighting module in the lighting device of FIG. 3.
Figure 5:
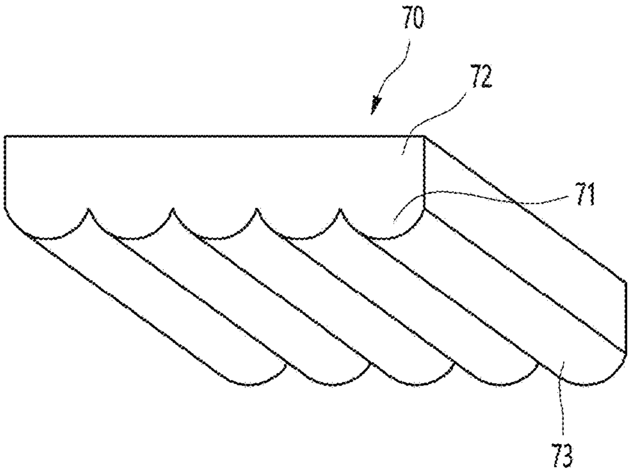
FIG. 5 is a perspective view illustrating an example of a lens plate in a lighting device according to an embodiment of the invention.
Figure 6:
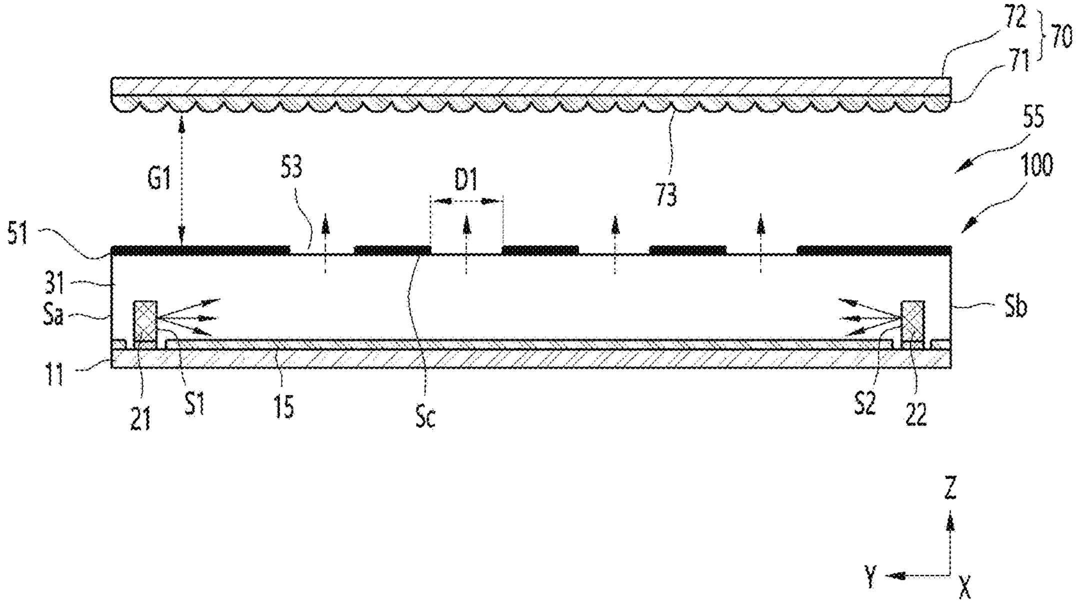
FIG. 6 is a first modified example of a lighting module in the lighting device of FIG. 2.
Figure 7:
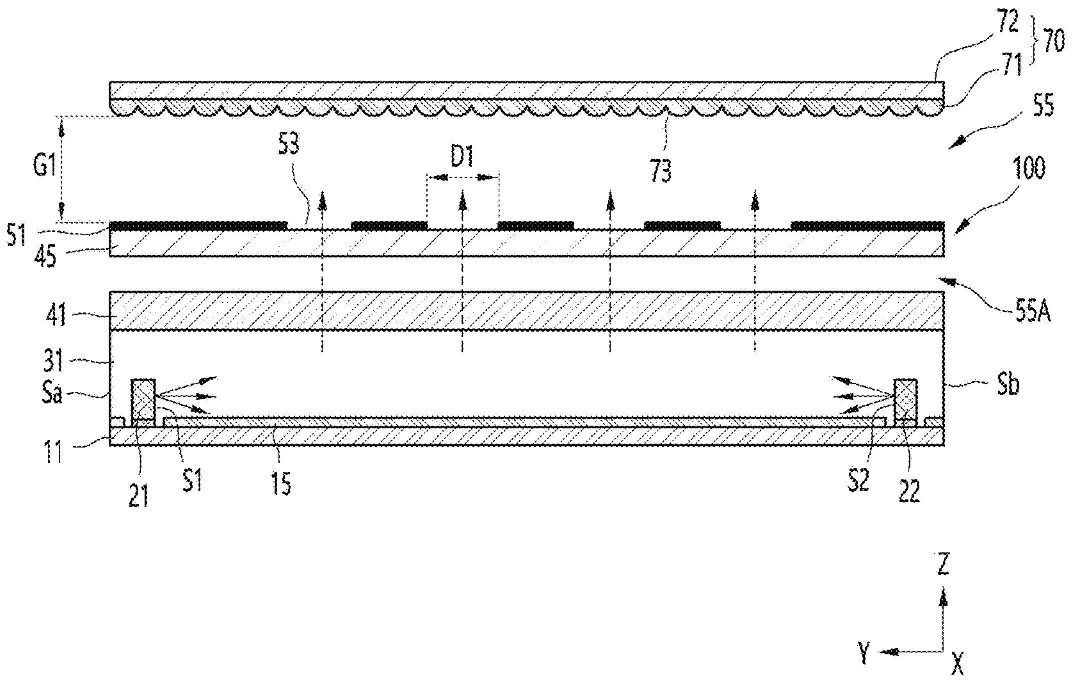
FIG. 7 is a second modified example of a lighting module in the lighting device of FIG. 2.
Figure 8:
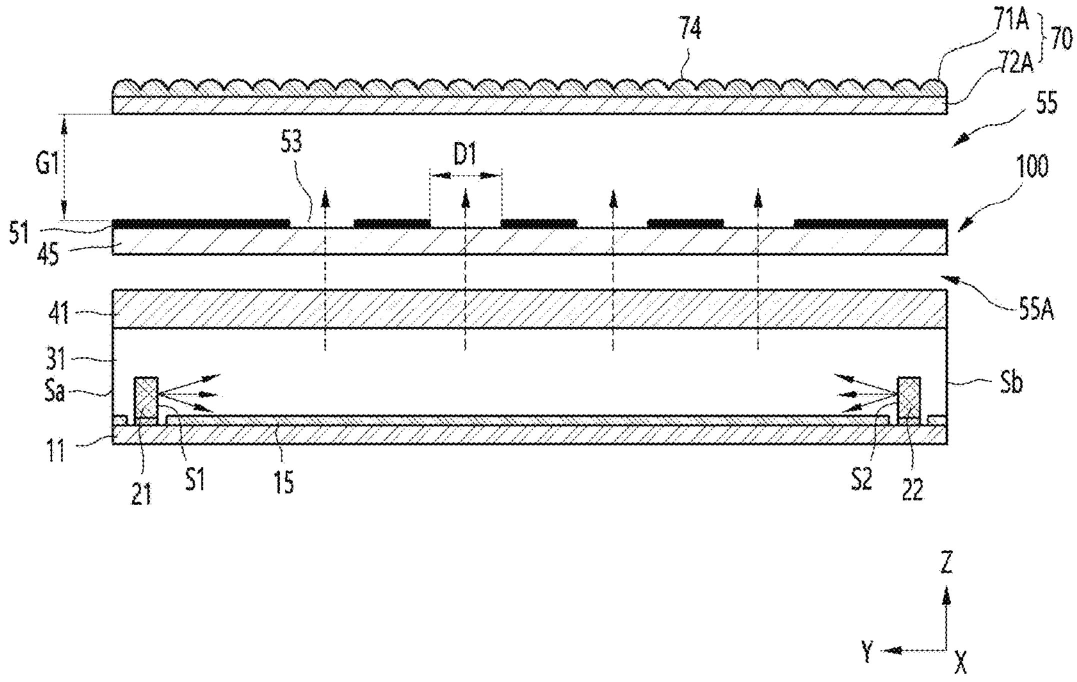
FIG. 8 is another example of a lens plate in the lighting device of FIG. 7.
Figure 9:
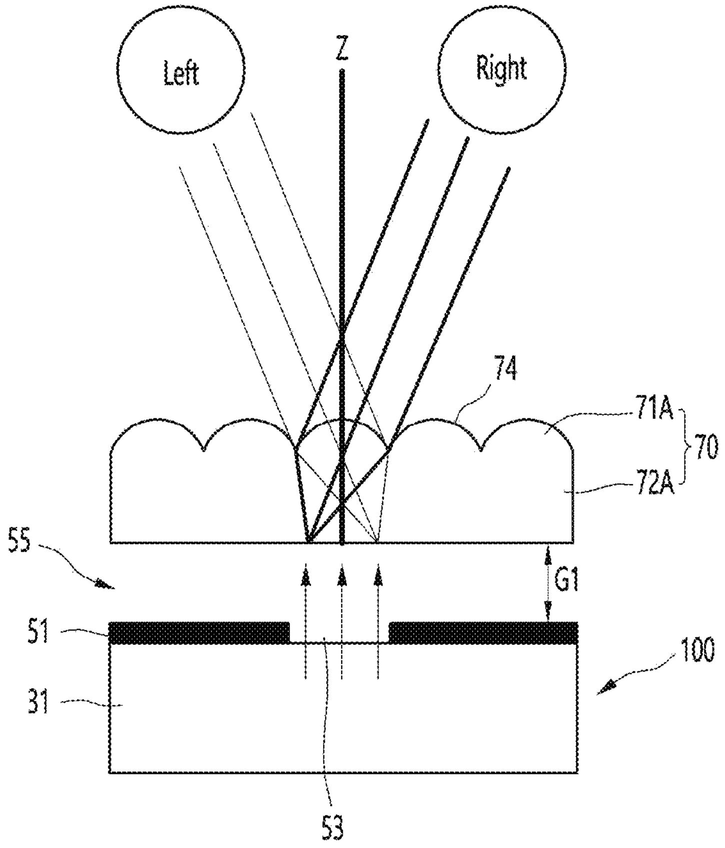
FIG. 9 is an example illustrating a path of light emitted by the lens plate of FIG. 8.
Figure 10:
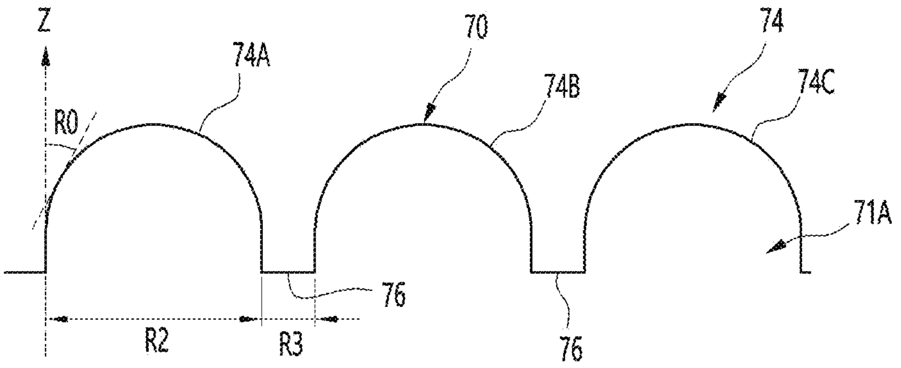
FIG. 10 is a first modified example of the lens portion of the lens plate of FIGS. 8 and 9.
Figure 12:
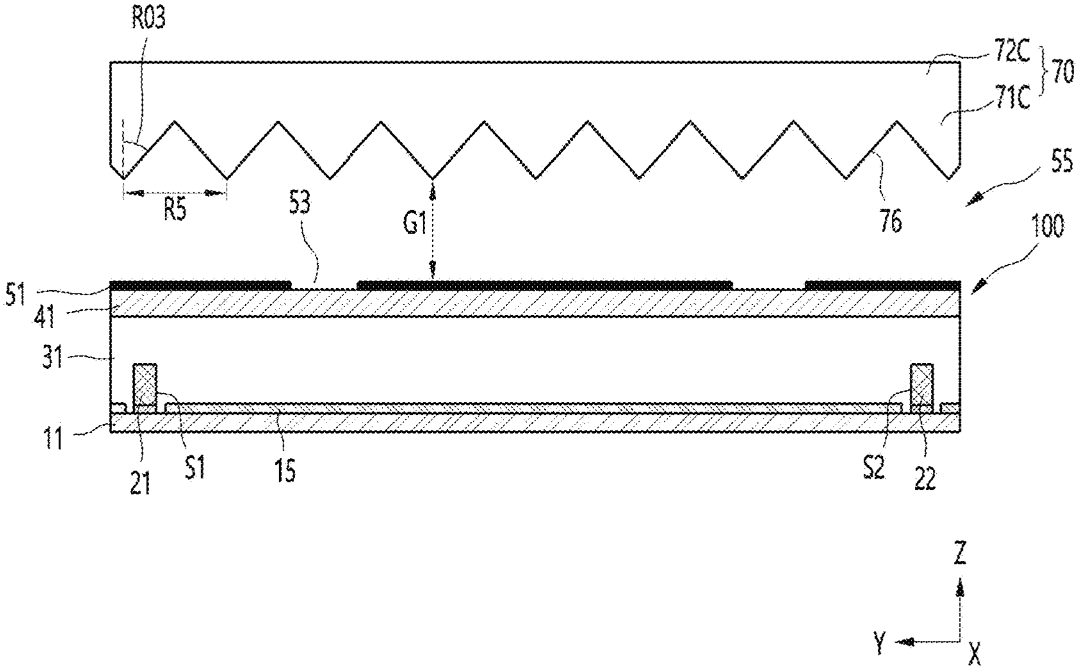
FIG. 12 is another example of a lens plate in the lighting device of FIG. 2.

FIG. 1 is a plan view showing a lighting device according to a first embodiment of the invention, FIG. 2 is an example of a cross-sectional view on the A1-A1 side of the lighting device of FIG. 1, and FIG. 3 is a view explaining a stereoscopic effect in the lighting device of FIG. 2 4 is a view for explaining an example in which the size of a stereoscopic image is adjusted according to the interval between the lens plate and the lighting module in the lighting device of FIG. 3, and FIG. 5 is a perspective view showing an example of a lens plate in the lighting device according to the embodiment of the invention, FIG. 6 is a first modified example of the lighting module in the lighting device of FIG. 2, FIG. 7 is a second modified example of the lighting module in the lighting device of FIG. 2, and FIG. 8 is another example of the lens plate in the lighting device of FIG. 7, FIG. 9 is an example showing the path of light emitted by the lens plate of FIG. 8, FIG. 10 is a first modified example of the lens unit of the lens plate of FIGS. 8 and 9, and FIG. is a second modified example of the lens portion of the lens plate of FIGS. 8 and 9, and FIG. 12 is another example of the lens plate in the lighting device of FIG. 2.

Referring to FIGS. 1 to 5, the lighting device 101 may include a lighting module 100 and a lens plate 70. The lighting module 100 may irradiate a point light source of uniform intensity in one direction through the opening portion 53 disposed on the emission surface. One or more opening portions 53 may be disposed, and the number of stereoscopic images of the lighting device 101 may be determined by the number of opening portions 53. The lens plate 70 may be disposed in a light emission direction of the lighting module 100. The lens plate 70 emits the incident light as a stereoscopic image or stereoscopic lighting. The stereoscopic image or stereoscopic lighting may be implemented as a contrast of light and dark having a difference between the brightest region and the darkest region, or may give a stereoscopic effect in a three-dimensional form by using a depth of luminous intensity or a difference in luminous intensity. The lighting module 100 may include a substrate 11, light sources 21 and 22 disposed on the substrate 11, a resin layer 31 covering the light sources 21 and 22, and a light blocking layer 51 having an opening portion 53 on the resin layer 31. In the lighting module 100, one or a plurality of first light transmitting layers 41 may be disposed between the light blocking layer 51 and the resin layer 31. The first light transmitting layer 41 may be a layer having no impurities or a layer having at least one or both of a diffusing agent and a phosphor. The light passing through the first light transmitting layer 41 is implemented in the form of a surface light source having a uniform intensity, but after passing through the opening portion 53, the light may emit in the form of a point light source having uniform intensity corresponding to the shape of the opening portion 53. At least one opening portion 53 may be disposed on a region closest to at least one of the light sources 21 and 22, or one or more opening portions 53 may be disposed between upper regions of the light sources 21 and 22. The thickness of the lighting module 100 is a vertical distance from the lower surface of the substrate 11 to the surface from which light is emitted or the upper surface of the light blocking layer 51, and may be 5 mm or less, for example, in the range of 2 mm to 5 mm or 2.5 mm to 3 mm. The lighting module 100 is provided in a thin thickness, so that it may be applied in a flexible structure, or may be applied to a lamp housing or bracket having various curves or curved surfaces. The thickness of the lighting module 100 may be 200% or less, for example, in a range of 150% to 200% of the thickness of the resin layer 31. When the thickness of the lighting module 100 is thinner than the above range, the light diffusion space is reduced to generate a hot spot. When the thickness is larger than the thickness range, spatial installation restrictions and design freedom may be reduced due to the module thickness. In the embodiment of the invention, the thickness of the lighting module 100 is provided to be 5 mm or less, so that a curved structure is possible, thereby reducing design freedom and spatial restrictions. The lighting module 100 may be applied to various modules or lamp devices that require stereoscopic lighting or stereoscopic effect, for example, a vehicle lamp, a home lighting device, and an industrial lighting device. For example, in the case of a lighting module applied to a vehicle lamp, it may be applied to a head lamp, a side lamp, a side mirror lamp, a fog lamp, a tail lamp, a turn signal lamp, a backup lamp, a stop lamp, daytime running right, vehicle interior lighting, door scarf, rear combination lamp, etc.

Substrate 11

The substrate 11 may include a printed circuit board (PCB) having wiring. The substrate 11 may include, for example, a resin-based printed circuit board (PCB), a metal core PCB, a flexible PCB, a non-flexible PCB, a ceramic PCB, or an FR-4 substrate. The substrate 11 includes a wiring layer (not shown) thereon, and the wiring layer may be electrically connected to the light sources 21 and 22. When a plurality of light sources 21 and 22 are arranged on the substrate 11, the plurality of light sources 21 and 22 may be connected in series, parallel, or series-parallel by the wiring layer. The substrate 11 may function as a base member or a support member positioned under the light sources 21 and 22 and the resin layer 31. The length of the first direction Y and the length of the second direction X of the substrate 11 may be the same or different from each other, for example, the length of the first direction Y may be more than the length of the second direction X. The first direction Y and the second direction X may be directions orthogonal to each other. The thickness of the substrate 11 may be 0.5 mm or less, for example, in the range of 0.3 mm to 0.5 mm. Since the thickness of the substrate 11 is provided to be thin, the thickness of the lighting module may not be increased. In the lighting module 100, the plurality of light sources 21 and 22 may be disposed to face at least one side of the side surfaces of the substrate 11, two sides opposite to each other, different sides, or all sides of the substrate 11. The substrate 11 may include a connector in a portion to supply power to the light sources 21 and 22. A region in the substrate 11 in which the connector is disposed is a region in which the resin layer 31 is not formed, and may be a partial region of the substrate 11. When the connector is disposed on the bottom of the substrate 11, the region may be removed. The top view shape of the substrate 11 may be a rectangle, a square, or other polygonal shapes, and may be a bar shape having a curved shape. The substrate 11 may include a member having a protective layer or a reflective layer thereon. The protective layer or the reflective layer may include a member having a solder resist material, and the solder resist material is a white material and may reflect incident light.

Reflective Layer 15

The reflective layer 15 may be attached to the upper surface of the substrate 11 or may be disposed between the substrate 11 and the resin layer 31. An adhesive layer, for example, a material such as UV adhesive, silicone, or epoxy, may be formed between the reflective layer 15 and the substrate 11. The reflective layer 15 may be provided as a film made of any one of a resin material, transparent PET, white polyethylene terephthalate (PET), and an Ag sheet. A plurality of reflective dots may be disposed on the reflective layer 15 to reflect incident light. The plurality of reflective dots may include ink, for example, may be printed with a material including any one of $TiO2$, $CaCO3$, $BaSO4$, $Al2O3$, Silicon, and PS. In addition, a density of the plurality of reflective dots may be arranged such that a distance between the plurality of reflective dots decreases or a cross-sectional area increases as the distance from the light sources 21 and 22 increases. Here, the reflective layer 15 has an open region, and the light sources 21 and 22 may be disposed through the open region. The reflective layer 15 may be formed on the entire upper surface of the substrate 11, or may be disposed on a single region or a plurality of regions having a predetermined shape. As another example, a layer having a phosphor may be disposed in the region of the reflective layer 15. That is, a phosphor layer may be disposed between the upper surface of the substrate 11 and the resin layer 31. The phosphor layer disposed under the resin layer 31 provides wavelength-converted light in the direction of the emission surface.

Resin Layer 31

The resin layer 31 may be disposed on the substrate 11. The light sources 21 and 22 may be covered or sealed with the resin layer 31 on the substrate 11. The light sources 21 and 22 may be adjacent to at least one side or both sides of the side surfaces Sa and Sb of the resin layer 31. For example, the first light source 21 may be disposed adjacent to the first side surface Sa of the resin layer 31, and the second light source 22 may be disposed adjacent to the second side surface Sb opposite to the first side surface Sa. At least one or two or more of the side surfaces of the resin layer 31 may be straight or curved, and may be on the same vertical plane as the side surface of the substrate 11. The resin layer 31 may emit light through the upper surface Sc and/or the side surface. The upper surface of the resin layer 31 may include a flat horizontal surface, a concave surface, or a convex surface. The resin layer 31 may be adhered to the upper surface of the substrate 11, or may be adhered to the substrate 11 and the reflective layer 15. The resin layer 31 may be formed of a transparent material. The resin layer 31 may include a transparent resin material such as silicone or epoxy or a plastic material. The resin layer 31 may be made of a transparent resin material, for example, a resin material such as UV (ultra violet) resin, epoxy, or silicone. The UV resin may be, for example, a resin (oligomer type) having a urethane acrylate oligomer as a main material as a main material. Since the resin layer 31 using the above-described composition is formed of a resin such as silicone, epoxy or UV resin instead of a light guide plate, the refractive index and thickness may be easily adjusted, and adhesive properties, reliability, and mass production speed may be satisfied. As another example, a diffusing agent may be added to the resin layer 31 to diffuse light. The diffusing agent may include at least one of a poly methyl meth acrylate (PMMA) series, $TiO_2$, $SiO_2$, $Al_2O_3$, and silicon series.

Light Source 21 and 22

Figure 13:
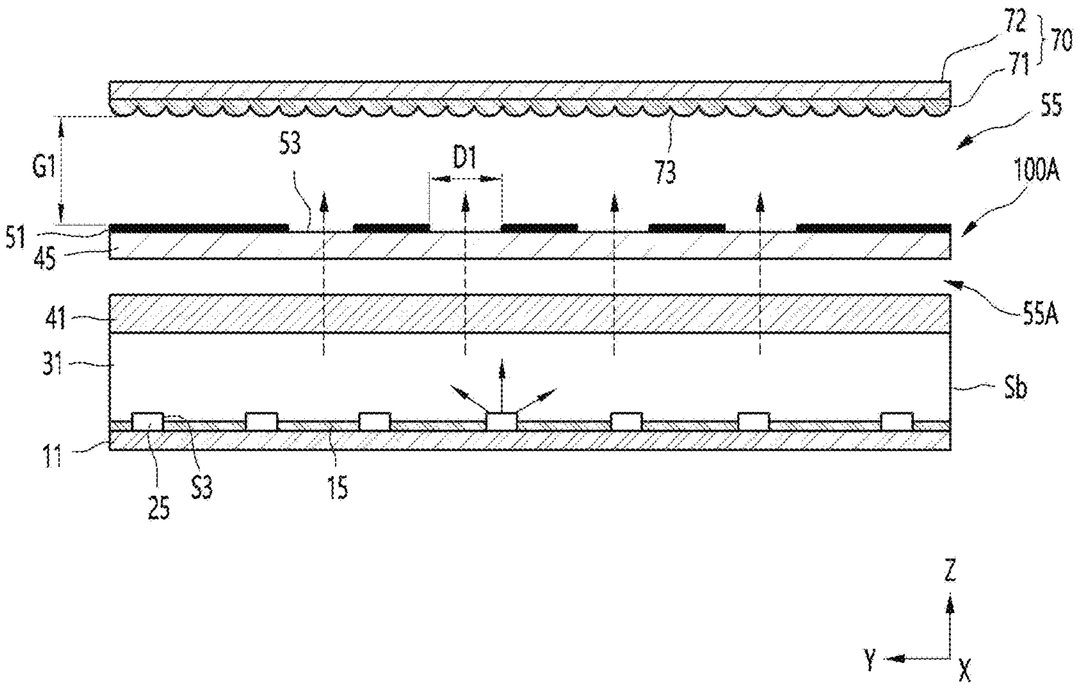
FIG. 13 is an example of a cross-sectional side view of a lighting device according to a second embodiment of the invention.

The plurality of light sources 21 and 22 may include a plurality of first light sources 21 and/or a plurality of second light sources 22. The first light source 21 may be adjacent to or face the first side surface Sa of the resin layer 31, and the second light source 22 may be adjacent to or face the second side surface Sb of the resin layer 31. The first light sources 21 may be arranged in at least one column on the first region of the substrate 11, and the second light sources 22 may be arranged in at least one column on the second region of the substrate 11. Any one of the first or second light sources 21 and 22 may be arranged in two or more rows. As shown in FIGS. 1 and 13, when the first and second light sources 21 and 22 are arranged in an N×M matrix on the substrate 11, the N may be one row or two or more rows, and the M may be one column or two or more columns. The light sources 21 and 22 may emit light in at least one direction. For example, the first light source 21 may emit light in the direction of the second light source 22 or the second side surface Sb. The second light source 22 may emit light in the direction of the first light source 21 or the first side surface Sa. Each of the light sources 21 and 22 may be implemented as a side view type package having an LED chip. As another example, each of the light sources 21 and 22 may be implemented as a top-view type package having an LED chip or an LED chip. For example, it may be implemented as a flip chip, a horizontal chip, or a vertical chip. The package may include a body or a reflective body disposed on the periphery of the LED chip, and may adjust the directional angle of the LED chip and protect the LED chip. The light sources 21 and 22 in the form of a package may emit light in one direction or one surface. The LED chip may include at least one or both of a blue LED chip, a red LED chip, and a green LED chip. Each of the packages may have one LED chip or different LED chips, and at least one or both of the first and second light sources 21 and 22 may be emitted at least one or two or more of blue, green, red, or white. The first light source 21 may emit light through the first surface S1, and the second light source 22 may emit light through the second surface S2. The first surface S1 may be a surface facing the second light source 22, and the second surface S2 may be a surface facing the first light source 21. The first light source 21 and the second light source 22 may be disposed to face each other or to be displaced from each other. As another example, the light sources 21 and 22 may include organic light emitting diodes (OLEDs).

First Light Transmitting Layer 41

The first light transmitting layer 41 may be disposed on the resin layer 31. The first light transmitting layer 41 may be adhered to the upper surface of the resin layer 31 in the form of a film, or may be formed of a resin material. The first light transmitting layer 41 may be adhered to the resin layer 31 by self-adhesiveness without a separate adhesive. Accordingly, it is possible to reduce the process of separately attaching the adhesive, and it is possible to avoid using an adhesive that is harmful to the human body, thereby reducing process or material waste. The first light transmitting layer 41 may be removed. The first light transmitting layer 41 may diffuse the light emitted through the resin layer 31. Since a specific color may not be mixed when the luminous intensity of light is high, the first light transmitting layer 41 may diffuse and mix the lights. The material of the first light transmitting layer 41 may be a diffusion material or a light guide material. The first light transmitting layer 41 may include at least one of a polyester (PET) film, a poly methyl methacrylate (PMMA) material, or a polycarbonate (PC) material. The first light transmitting layer 41 may be provided as a film made of a resin material such as silicone or epoxy. The first light transmitting layer 41 may include a single layer or multiple layers. The thickness of the first light transmitting layer 41 may be thinner than the thickness of the resin layer 31. The thickness of the first light transmitting layer 41 may be 25 um or more, and may be, for example, in the range of 25 to 250 μm or in the range of 100 to 250 μm. The first light transmitting layer 41 may provide incident light having the above thickness range as uniform surface lighting. The first light transmitting layer 41 may include at least one or two or more of a diffusion agent such as a bead, a phosphor, and an ink particle. The phosphor may include, for example, at least one of red, amber, yellow, green, and white phosphors. The ink particles may include at least one of metal ink, UV ink, and curing ink. The size of the ink particles may be smaller than the size of the phosphor. The surface color of the ink particles may be any one of green, red, yellow, and blue.

Light Blocking Layer 51

The light blocking layer 51 may be disposed on the uppermost layer of the lighting module 100. The light blocking layer 51 may be disposed closest to the lens plate 70 among the layers of the lighting module 100. The light blocking layer 51 may include a metal or non-metal material. The light blocking layer 51 may include an absorbing material or a reflective material. The light blocking layer 51 may be a printed layer or a separately attached layer on the first light transmitting layer 41. The light blocking layer 51 may absorb or reflect visible light, infrared light, or some ultraviolet light. For example, the light blocking layer 51 may absorb or reflect a wavelength in a range of 380 nm to 800 nm. For example, the light blocking layer 51 may be black ink or a black printed layer. The light blocking layer 51 may be an absorbing material having carbon or carbon nanotubes, a black resist material, or a black matrix material. As another example, the light blocking layer 51 may be a reflective layer, for example, may be formed of a layer having aluminum (Al) or silver (Ag), or an alloy layer having at least one of the above metals. The light blocking layer 51 may be a single layer or multiple layers. For example, in the case of a multi-layer, a first layer made of a black material and a second layer made of a reflective material may be included, and in this case, the first layer may be disposed on the second layer. The light blocking layer 51 may be implemented using a masking film. The thickness of the light blocking layer 51 may be 0.1 μm or more, for example, 0.1 to 5 μm. When the thickness of the light blocking layer 51 is greater than the above range, improvement in light blocking efficiency is insignificant, and when the thickness of the light blocking layer 51 is smaller than the above range, transmittance may be increased. The light blocking layer 51 may include one or a plurality of opening portions 53. The opening portion 53 may vertically penetrate from the upper surface to the lower surface of the light blocking layer 51. The top view shape of the opening portion 53 may be a polygonal shape such as a square, rectangular, triangular or pentagonal shape, a circular or elliptical shape, or an irregular shape. The length D1 of the opening portion 53 in the first direction Y and the length D3 of the second direction X may be the same as or different from each other. The plurality of opening portions 53 may be spaced apart from each other. A distance between adjacent opening portions 53 may be more spaced apart than lengths D1 and D3 in either direction of each opening portion 53. That is, due to the distance between the opening portions 53, interference between adjacent opening portions 53 may be minimized and a stereoscopic effect may be maximized. The plurality of opening portions 53 may be arranged at regular intervals in the first direction and/or the second direction, or may be arranged at different intervals from each other.

As shown in FIG. 1, the opening portions 53 may have the same shape or different shapes. Also, at least one or two or more of the opening portions 53 may be disposed on a straight line through which the first and second light sources 21 and 22 pass for the luminous intensity of the light emitted from the light sources 21 and 22. The opening portion 53 of the light blocking layer 51 may be an air region for linearity of light or may be formed of a resin material. The lengths D1 and D3 in either direction of the opening portion 53 may be smaller than the interval G1 between the light blocking layer 51 and the lens plate 70, that is, the minimum interval. That is, the interval G1>lengths D1 and D3 may be satisfied. The lengths D1 and D3 in one direction of the opening portion 53 may be at least 3 mm, for example, in the range of 3 mm to 10 mm, or in the range of 4 mm to 8 mm. When the lengths D1 and D3 of the opening portion 53 are larger or smaller than the range, the stereoscopic effect may be reduced. Here, at least one or all of the opening portions 53 may be disposed in a region that does not overlap the light sources 21 and 22 in a vertical direction or a light emission direction. In the light blocking layer 51, the total area of the opening portions 53 may be 50% or less of the upper surface area of the resin layer 31, for example, in the range of 1% to 50% or in the range of 1% to 25%. When the total area of the opening portions 53 is greater than the above range, the stereoscopic effect of the opening portions 53 may be reduced. The first light transmitting layer 41 and the light blocking layer 51 may be in close contact with the upper surface of the resin layer 31 or may be spaced apart from the upper surface of the resin layer 31. The first light transmitting layer 41 and the light blocking layer 51 may be disposed in a region between the resin layer 31 and the lens plate 70.

Lens Plate 70

The lens plate 70 may include a light transmitting portion 72 and a plurality of convex portions 71. The plurality of convex portions 71 may be disposed on one surface or the other surface of the light transmitting portion 72. The plurality of convex portions 71 may be disposed on one surface on which light is incident toward the light transmitting portion 72, or may be disposed on the other surface on which light is emitted from the light transmitting portion 72. The convex portion 71 may include a lenticular lens shape or a semi-cylindrical micro lens shape. The light transmitting portion 72 may be a member supporting the plurality of convex portions 71. The light transmitting portion 72 is provided in the form of a plate or a film, and emits incident light from the inside in an emission direction. As shown in FIG. 5, the light transmitting portion 72 and the plurality of convex portions 71 may be integrally formed. As another example, the plurality of convex portions 71 may be attached to one surface or the other surface of the light transmitting portion 72 using a light-transmitting material. A material of the light transmitting portion 72 may be resin or glass, and the resin may include a thermoplastic polymer or a photocurable polymer. In addition, a material of the light transmitting portion 72 may include polycarbonate, polymethylmethacrylate, polystyrene, or polyethylene terephthalate. The material of the light transmitting portion 72 may be made of a UV-curing resin including an oligomer, and more specifically, a resin having a urethane acrylate oligomer as a main raw material. That is, a resin in which a urethane acrylate oligomer, which is a synthetic oligomer, and a polymer type, which is a polyacrylic, is mixed may be used. The convex portion 71 may be formed of a thermoplastic polymer or a photocurable polymer, or may be formed of the same material as the light transmitting portion 72. The convex portion 71 may be formed through a photomask process on one surface or the other surface of the light transmitting portion 72. The convex portion 71 may have no difference in refractive index from the transmissive portion 72 or may be less than or equal to 0.2, thereby minimizing light loss due to the refractive index difference. The thickness of the light transmitting portion 72 may be 0.1 mm or more, for example, in the range of 0.1 mm to 10 mm, or in the range of 0.1 mm to 0.25 mm. When the thickness of the light transmitting portion 72 is less than the above range, the stereoscopic effect may be reduced. When the thickness is thicker than the above range, the improvement of the stereoscopic effect is insignificant and the thickness of the lighting device may be increased. As shown in FIGS. 2 to 5, the plurality of convex portions 71 are arranged in the first direction Y on the lower surface (or one surface) or the upper surface (or the other surface) of the light transmitting portion 72, and may have a long length in the second direction X. The convex portions 71 may be arranged in the second direction X according to the stereoscopic image of the lighting device 101 and may have a long length in the first direction Y. The convex portion 71 may have a stripe or bar shape having a long length in the second direction X, a sinusoidal shape, or a sawtooth shape. The plurality of convex portions 71 may be arranged as a combination of lens portions or unit patterns disposed on one surface or the other surface of the light transmitting portion 72. The convex portion 71 may have a hemispherical shape, a semi-elliptical shape, or a polygonal shape in a side cross-sectional shape in the second direction X. The convex portion 71 may be provided in a shape capable of refracting incident light, and may be a member capable of forming a stereoscopic effect. The lens plate 70 may be provided with an area equal to or larger than the upper surface area of the lighting module, for example, may be arranged to extended further in a direction (e.g., X direction) orthogonal to a direction (e.g., X direction) in which light is emitted from the light sources 21 and 22 (e.g., Y direction), or may be arranged to extend further in the region between the X direction and the Y direction, so that the length of the convex portions 71 may be provided longer than the length of the lighting module. The convex portion 71 may reflect and/or refract incident light and form a stereoscopic effect on an image by the light emitted through the other surface of the transmitting portion 72. The lens plate 70 may extract a point light source of uniform intensity incident through the convex portion 71 as a stereoscopic image or stereoscopic lighting. Here, in the lens plate 70, a surface (e.g., an upper surface or the other surface) opposite to the surface on which the convex portion 71 may be a flat surface. As shown in FIG. 3, the width R2 of the convex portion 71 is the maximum length in a direction (e.g., the first direction) orthogonal to the longitudinal direction of the convex portion 71, and may be 5 μm or more, for example, in the range of 5 to 100 μm or in the range of 10 to 80 μm. As the width R2 of the convex portion 71 is smaller, the sharpness of the stereoscopic image may be improved. The height R1 of the convex portion 71 is a protruding height and may be smaller than the width R2. For example, the width R2 may be 0.5 or less, for example, in the range of 0.1 to 0.48. When the height R1 of the convex portion 71 is greater than the above range, the size of the unit pattern (i.e., the convex portion) increases, when it is smaller than the above range, a difference in sharpness of the stereoscopic effect may be reduced. The interval R3 between the convex portions 71 may be 1 μm or more, for example, in the range of 1 to 100 μm or in the range of 1 to 10 μm. The width R2 and the height R1 of the convex portion 71 may be selected within the above range in consideration of a difference in sharpness of a stereoscopic image or stereoscopic surface lighting. As shown in FIG. 3, the lower surface of the light blocking layer 51 or the upper surface Sc1 of the first light transmitting layer 41 may emit surface lighting through the opening portion 53. The light L1 emitted through the opening portion 53 of the light blocking layer 51 may be emitted in the shape of a point light source of uniform intensity, and the light L2 that is refracted and transmitted through the curved surface 73 of the convex portion 71 of the lens plate 70 forms a stereoscopic image in a direction perpendicular to the longitudinal direction of the convex portion 71 in the upper region Rz of the opening portion 53. In this case, the center region Rc perpendicular to the opening portion 53 may have the highest luminous intensity, and both side regions Ra and Rb may have lower luminous intensity than the center region Rc. A stereoscopic image of the lighting device 101 may be realized by the difference in luminous intensity. As shown in FIG. 4, in the stereoscopic image on the lens plate 70, the regions Rc1 and Rc2 in which the stereoscopic image is formed may vary according to the interval G1, or the shape or size of the stereoscopic image may vary. The interval G1 may be implemented as a first air layer 55, and the first air layer 55 may be an empty region between two layers or a region where a bracket is coupled to an outer portion.

According to an embodiment of the invention, the lens plate 70 and the light blocking layer 51 may be spaced apart from each other by a predetermined interval. The interval G1 may be a distance through which the light incident through the opening portion 53 of the light blocking layer 51 may be diffused, and may be a distance through which the size of a stereoscopic image may be adjusted. The interval G1 may be 5 mm or more, for example, in the range of 5 mm to 50 mm or in the range of 5 mm to 20 mm. When the interval G1 is smaller than the above range, the size of the stereoscopic image is small, so it may be difficult to implement the stereoscopic effect according to the difference in luminous intensity.

The lens plate 70 may be parallel to the upper surface of the light blocking layer 51, inclined with respect to the first direction Y, inclined with respect to the second direction X, or inclined with respect to in first and second directions Y and X. Here, the inclination in the first direction Y may gradually narrow or widen the distance from one end of the lens plate 70 in the first direction Y to the other end of the light blocking layer 51. The inclination in the second direction X may gradually narrow or widen the interval between the light blocking layer 51 and the lens plate 70 from one end of the lens plate 70 in the second direction X toward the other end of the lens plate 70. Depending on the inclination angle or the inclination direction of the lens plate 70, various stereoscopic effects may be given due to the difference between the luminous intensity and path of the light emitted through the lens plate 70, for example, the stereoscopic image may include a curvature rather than a straight line. The lens plate 70 may be rotated based on an axis (e.g., Z direction) perpendicular to the center of the first direction Y of the resin layer 31. When the lens plate 70 is rotated on the blocking layer 51, a stereoscopic image or stereoscopic lighting may be provided in a rotated form according to the rotated angle. In this case, the sharpness of the stereoscopic image may be provided in a form that is gradually lowered. For example, (A)-(E) of FIG. 26 shows an example in which the lens plate 70 is rotated on the light blocking layer 51 or the opening portion 53, and the stereoscopic image Im-1 may be seen with the lens plate 70 in a rotated form by 3 degrees to 6 degrees (A in FIG. 26), 8 degrees to 12 degrees (B in FIG. 26), 18 degrees to 22 degrees (C. in FIGS. 26), 35 to 45 degrees (D in FIG. 26), or 45 degrees to 55 degrees (E in FIG. 26). The rotation angle of the lens plate 70 may be provided in the range of 1 degree to 180 degrees. In this case, the sharpness of the stereoscopic image may be lowered depending on the rotation angle, and may be displayed in a form that may interfere with each other. That is, there is an effect of providing various stereoscopic images or stereoscopic lighting according to the rotation angle of the lens plate 70.

Figure 28A:
FIG. 28A to 28C are diagrams illustrating stereoscopic surface lighting or a stereoscopic image according to rotation and tilt of a lens plate in a lighting device according to an embodiment(s) of the invention.
Figure 28B:
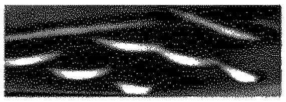
Figure 28C:
Figure 29A:
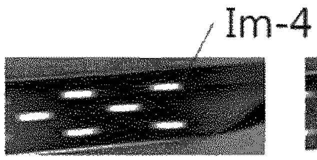
FIG. 29A to 29D are diagrams illustrating stereoscopic surface lighting or a stereoscopic image according to an interval between the lens plate and the opening portion of the lighting module in the lighting device according to the embodiment(s) of the invention.
Figure 29B:
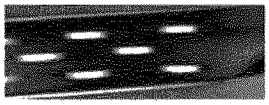
Figure 29C:
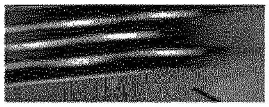
Figure 29D:
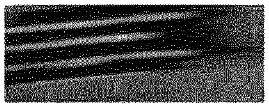

The inclination of the lens plate 70 in the second direction X may be defined as the tilt of the image. Since the convex portion 71 has a long length in the second direction X, it is possible to tilt the stereoscopic image or the stereoscopic lighting. As shown in (A)-(D) of FIG. 27, the stereoscopic image Im-2 may be changed in a tilted form according to the inclination angle in the second direction X of the lens plate 70. In FIG. 27, (A) is a front image, and when the inclination angle gradually increases from (B) to (D), the stereoscopic image may be viewed in a tilted form at a gradually large angle. In FIG. 27, (A) is a case with a tilt angle of 0 degrees, (B) is a case with a tilt angle of 13 to 18 degrees, (C) is a case with a tilt angle of 18 to 22 degrees, (D) is a case with a tilt angle of 30 degrees to 40 degrees. The tilt angle may be 15 degrees or more, for example, in the range of 15 to 40 degrees, and when it is larger or smaller than the range, the degree of distortion of the image may be excessive or insufficient. The invention may provide various stereoscopic images or stereoscopic lighting according to the tilt angle of the lens plate 70. In addition, in each stereoscopic image Im-2, the region having the highest luminous intensity or the center region may be a region corresponding to the opening portion 53. That is, there is an effect of providing various stereoscopic images or stereoscopic lighting according to the tilt angle of the lens plate 70. Here, an example of tilting and rotating the lens plate 70 will be referred to FIG. 28. As shown in FIGS. 3 and 28, according to the tilt and rotation, the stereoscopic image Im-3 may be viewed in various three-dimensional forms such as (A), (B) and (C), which are tilted and rotated. An example of a stereoscopic image of the lens plate 70 according to the interval G1 between the light blocking layers 51 will be referred to FIG. 29. As shown in FIGS. 29(A)-(D) and 3, it may be seen that the stereoscopic image Im-4 may give a stereoscopic image effect without deterioration of sharpness when the interval G1 of 5 mm or less (A in FIGS. 29) or 8 to 12 mm (B in FIG. 29), 13 mm to 15 mm (C in FIG. 29), 18 mm to 21 mm (D in FIGS. 29), and 12 mm or less. The direction in which the pattern such as the convex portion 71 is arranged and the stereoscopic image are arranged to be displaced in a direction perpendicular to each other, that is, at an angle of 90 degrees, and as the pattern such as the convex portion 71 rotates, the stereoscopic image may be rotated while maintaining an angle (i.e., 90 degrees). The lighting device 101 according to an embodiment of the invention may be viewed various stereoscopic images or stereoscopic lighting according to the interval between the lens plate 70 and the light blocking layer 51, and the rotation and/or tilt angle of the lens plate 70. Such stereoscopic lighting may be provided as a long image in a direction orthogonal to the longitudinal direction of the convex portion 71 centered on the opening portion 53, and is the highest luminous intensity on the opening portion 53 and may be provided with a lower luminous intensity as the distance from the highest luminous intensity region increases. That is, the luminous intensity of the stereoscopic image may be gradually reduced based on the upper region of the opening portion 53, or an image having a sense of depth may be provided.

FIG. 6 is a first modified example of FIG. 2. As shown in FIG. 6, the light blocking layer 51 may be disposed on the upper surface of the resin layer 31. The light blocking layer 51 may be attached to the upper surface of the resin layer 31. In such a lighting device, since the first light transmitting layer 41 is removed and the light blocking layer 51 is disposed on the resin layer 31, the thickness of the lighting device may be reduced. The opening portion 53 of the light blocking layer 51 may be an air region or may be filled with a resin material for linearity of light.

FIG. 7 is a second modified example of FIG. 2. As shown in FIG. 7, a first light transmitting layer 41 and a second light transmitting layer 45 may be included between the light blocking layer 51 and the resin layer 31. The first light transmitting layer 41 may be disposed on the resin layer 31, and the second light transmitting layer 45 may be disposed between the first light transmitting layer 41 and the light blocking layer 51. As another example, the first light transmitting layer 41 having a diffusing agent is disposed on the resin layer 31, and the second light transmitting layer 45 having no impurity or having impurities may be disposed on the first light transmitting layer 41. A phosphor and/or ink particles may be added to at least one of the first and second light transmitting layers 41 and 45. A second air layer 55A may be disposed between the first light transmitting layer 41 and the second light transmitting layer 45. The second air layer 55A may be a region filled with air or an empty region between the two layers, and a bracket for supporting the lighting module 100 may be coupled to an outer portion thereof. Since the second air layer 55A is disposed on the resin layer 31, a hot spot of light may be reduced, and a stereoscopic effect may be realized by a difference in depth of light due to a refracted angle or path.

As shown in FIGS. 8 and 9, the convex portion 71A of the lens plate 70 may be disposed on the surface from which light is emitted to the lens plate 70, that is, the other surface or the upper surface. The convex portion 71A may have a hemispherical shape, a semi-elliptical shape, or a polygonal shape. The convex portion 71A may be formed integrally with the light transmitting portion 72A or may be attached with a separate lens material. The lower surface of the lens plate 70 may be a flat surface, and the interval G1 from the light blocking layer 51 to the lens plate 70 may be within the range disclosed above. The light emitted through the convex portion 71A may be dispersed left/right with respect to the central axis by the refracted emission angle on the surface of the convex portion 71A, thereby forming a stereoscopic image.

As shown in FIG. 10, the plurality of convex portions 71 and 71A of the lens plate 70 have hemispherical curved surfaces 74 (74A, 74B, and 74C), and are orthogonal to the arrangement direction of the convex portions 71 and 71A. The angle R0 between the direction Z and the tangent to the curved surfaces 74A, 74B, and 74C may be 5 degrees or more, for example, in the range of 5 to 85 degrees. Reflection and refraction angles of incident light or emitted light may be adjusted by the angle R0. The width R2 of the plurality of convex portions 71 and 71A may be 5 μm or more, for example, in the range of 5 to 100 μm or in the range of 10 to 80 μm. The connection portion 76 between the convex portions 71 and 71A is a part that connects the two convex portions 71 and 71A, and the distance or interval R3 is 1 μm or more, for example, 1 to 100 μm or 1 to 10 μm. The plurality of convex portions 71 and 71A may be disposed below or above the light transmitting portions 72 and 72A.

Figure 11:
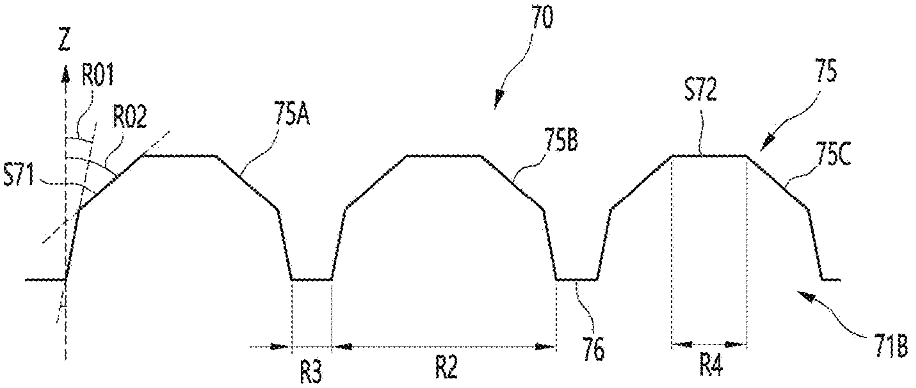
FIG. 11 is a second modified example of the lens portion of the lens plate of FIGS. 8 and 9.

As shown in FIG. 11, the convex portion 71B of the lens plate 70 has polygonal angled surfaces 75 (75A, 75B, and 75C), and an inclination angles R01 and RO2 between a direction Z perpendicular to the arrangement direction of the convex portions 71B and an angled inclined surfaces S71 may be provided in a range of 5 degrees or more, for example, 5 to 85 degrees. The angles R01 and R02 may be provided as a wider angle (R01<R02) as the distance from the central axis Z increases, and angles of reflection and refraction of incident light or emitted light may be adjusted. Here, the width R4 of each center region S72 of each convex portion 71B is arranged to be 10 μm or less, so that a decrease in the incident efficiency of light may be prevented. The outer inclined surface S71 of the center region S72 may have a width equal to or greater than the width of the center region S72. An interior angle between the center region S72 and the inclined surface S71 may be less than 180 degrees, for example, an obtuse angle. A decrease in the efficiency of light incident or emitted by the center region S72 and the inclined surface S71 may be prevented. The width R2 of the plurality of convex portions 71B may be 5 μm or more, for example, in the range of 5 to 100 μm or in the range of 10 to 80 μm. The connection portion 76 between the convex portions 71B is a part that connects the two convex portions 71B, and the distance or interval R3 may be 1 μm or more, for example, in the range of 1 to 100 μm or 1 to 10 μm. The plurality of convex portions 71B may be disposed below or above the light transmitting portion 72B.

Referring to FIG. 12, the lens plate 70 is disposed on the lighting module 100. The lens plate 70 may include a light transmitting portion 72C and a convex portion 71C. The convex portions 71C are arranged in a prism pattern shape, that is, a triangular shape, and the inclination angle R03 between the direction Z perpendicular to the arrangement direction of the convex portions 71C and the inclined surface 77 is 5 degrees or more. For example, it may be provided in a range of 5 to 85 degrees. The angle of reflection and refraction of the incident light or the emitted light may be adjusted by the angle R03. The interval R5 between the vertices of the convex portion 71C may be 5 μm or more, for example, in the range of 5 to 100 μm or in the range of 10 to 80 μm. The plurality of convex portions 71C may be disposed below or above the light transmitting portion 72C.

Figure 23:
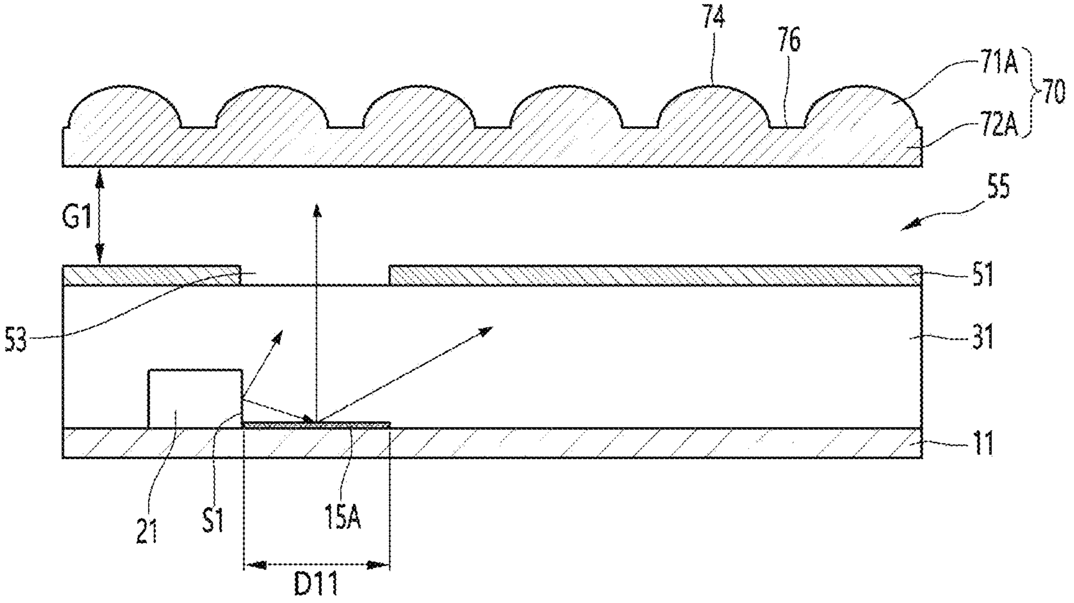
FIG. 23 is a modified example according to the first embodiment of the invention.

FIG. 23 is a modified example of FIG. 6. In the lighting module, a reflective portion 15A may be disposed between the resin layer 31 and the substrate 11. Unlike the reflective portion 15 according to the first embodiment, the reflective portion 15A according to the modified example may be disposed in a region overlapping the opening portion 53 of the light blocking layer 51 which is in a portion of the substrate 11 in the vertical direction. The reflective portion 15A may be formed with a predetermined width D11 on the emission surface S1 of the light emitting device 21, for example, horizontally and vertically in a range of 2 mm×2 mm to 15 mm×15 mm. Accordingly, the light emitted from the light emitting device 21 may directly travel through the opening portion 53 or may be reflected by the reflective portion 15A and emitted through the opening portion 53. This structure emits some light reflected by the reflective portion 15A through the opening portion 53, thereby eliminating direct hot spots by the light source 21 on the opening portion 53, and the light efficiency for the stereoscopic image(s) may be improved and a degradation of light intensity may be prevented.

Figure 24:
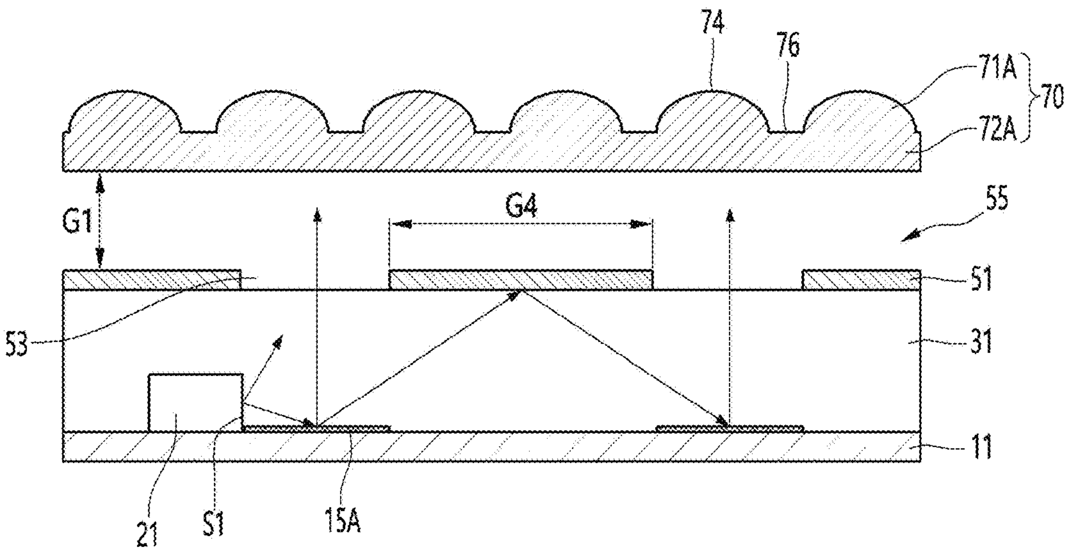
FIG. 24 is another modified example of FIG. 23.

FIG. 24 is a modified example of FIG. 23. A plurality of reflective portions 15A may be disposed on the substrate 11, and a plurality of opening portions 53 may be arranged at predetermined interval G4 in the light blocking layer 51. The reflective portions 15A and the opening portions 53 may be arranged in the same direction, for example, in a direction in which light is emitted. The predetermined interval G4 may be provided to be wider than a width (a horizontal width) of each of the convex portions 71A. Since the area of the upper surface of each reflective portion 15A may be larger than the respective area of the opening portion 53, the reflective portions 15A may improve the efficiency of light entering through the opening portion 53.

Second Embodiment

FIG. 13 is an example of a cross-sectional side view of a lighting device according to a second embodiment of the invention. The description of the second embodiment refers to the configuration disclosed above and may include the same configuration. Referring to FIG. 13, in the lighting device, a lighting module 100A and a lens plate 70 may be disposed on the lighting module 100A. The lighting module 100A may include a plurality of light sources 25 disposed on the substrate 11. Each of the plurality of light sources 25 may be implemented as a top-view type package having an LED chip or an LED chip. For example, it may be implemented as a flip chip, a horizontal chip, or a vertical chip. The package may include a body or a reflective body disposed on the periphery of the LED chip, and may adjust the directional angle of the LED chip and protect the LED chip. The light source 25 in the form of a package may emit light in the upper surface direction or the side surface direction. The LED chip may include at least one or all of a blue LED chip, a red LED chip, and a green LED chip. Each of the packages may have one LED chip or different LED chips, and the plurality of light sources 25 may emit at least one or two or more of blue, green, red, and white. The resin layer 31 may cover or seal the plurality of light sources 25. A reflective layer 15 is disposed between the resin layer 31 and the substrate 11, and the light sources 25 may pass through the reflective layer 15 and be mounted on the substrate 11. Here, when the flip chip is disposed on the substrate 11, the flip chip emits light through an upper surface and four side surfaces S3, and the light may be reflected by the reflective layer 15. A first light transmitting layer 41 is disposed on the resin layer 31 and a second light transmitting layer 45 is disposed on the first light transmitting layer 41, and only one of the first light transmitting layer 41 or the second light transmitting layer 45 may be disposed. At least one of the first and second light transmitting layers 41 and 45 may include a phosphor and/or a diffusing agent, and ink particles. A light blocking layer 51 may be disposed on the second light transmitting layer 45, and a point light source of uniform intensity is emitted to the lens plate 70 by the opening portion 53 of the light blocking layer 51. The light blocking layer 51 will be referred to in the description of the first embodiment disclosed above. At least one of the opening portions 53 of the light blocking layer 51 may vertically overlap the light source 25. The lens plate 70 has a plurality of convex portions 71 on one surface or the other surface of the light transmitting portion 72 and is spaced apart from the light blocking layer 51 to form an opening portion 53 of the light blocking layer 51. A point light source of uniform intensity incident through the light source may be illuminated with stereoscopic lighting or a stereoscopic image.

Figure 14:
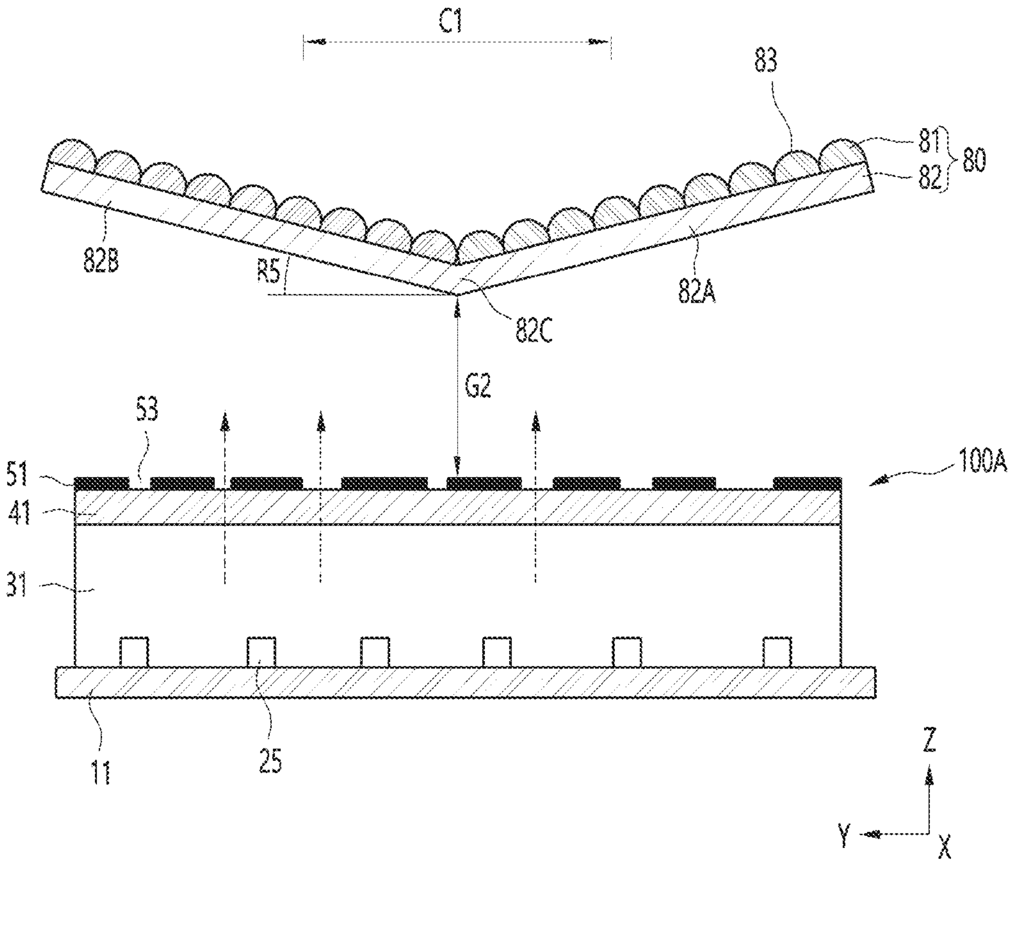
FIG. 14 is a first modified example of a lens plate in the lighting device of FIG. 13.
Figure 15:
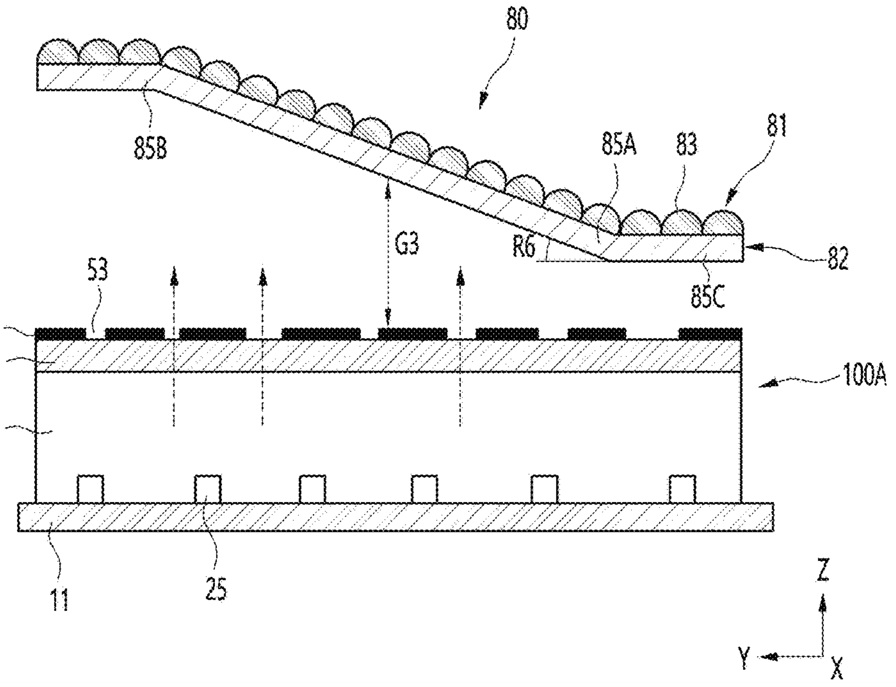
FIG. 15 is a second modified example of a lens plate in the lighting device of FIG. 13.

FIGS. 14 and 15 are first and second modified examples of the lens plate in the first and second embodiments. As shown in FIG. 14, the lens plate 80 includes a light transmitting portion 82 and a convex portion 81 on one or the other surface of the light transmitting portion 82, and the convex portion 81 is disposed on the light transmitting portion 82. In this case, light may be emitted through the curved surface 83 of the convex portion 81. The lens plate 80 may include inclined portions 82A and 82B that are inclined as the distance from the center portion 82C to the center of the lighting module 100A in the first direction Y increases. The inclined portions 82A and 82B may be disposed at an acute angle R5 with respect to a straight line horizontal to the center portion 82C. The lens plate 80 has a region in which the interval G2 between the inclined portions 82A and 82B and the light blocking layer 51 is different from each other in the first direction Y, and is disposed on the lighting module 100A. Therefore, various stereoscopic effects may be realized as the interval G2 is changed. Here, in order to prevent a problem that stereoscopic lighting interferes with each other in the center region C1 of the lens plate 80, the interval between the opening portions 53 of the light blocking layer 51 is maximized or interference between stereoscopic images may be reduced by minimizing the interval G2 from the lens plate 80. Alternatively, the interval between the convex portions 81 of the lens plate 80 may be further spaced apart, thereby reducing interference between stereoscopic images.

As shown in FIG. 15, the lens plate 80 includes a light transmitting portion 82 and a convex portion 81 on one or the other surface of the light transmitting portion 82, and when the convex portion 81 is disposed on the light transmitting portion 82, light may be emitted through the curved surface 83 of the convex portion 81. The lens plate 80 has a center portion 85A inclined, a first extension portion 85B horizontally extending from one end of the center portion 85A, and a second extension portion 85C horizontally extending from the other end portion of the lens plate 80. The length of the center portion 85A may be greater than the length of the first and second extension portions 85B and 85C. The inclination angle R6 of the center portion 85A may be an acute angle, and the first extension portion 85B may be disposed higher than the position of the second extension portion 85C. The first and second extension portions 85B and 85C are spaced apart from each other in a first direction, and the convex portions 81 of the lens plate 80 are arranged in a first direction Y and may be provided in a long length in a second direction X. Since the lens plate has regions having different intervals G3 from the light blocking layer 51 in the first direction Y and is disposed on the lighting module 100A, as the interval G3 changes, various stereoscopic effects may be implemented. Here, in order to reduce the interference between the stereoscopic image on the center portion 85A and the second extension portion 85C of the lens plate 80, the interval between the opening portions 53 of the light blocking layer 51 is maximized or the interval G3 from the lens plate 80 may be reduced. Alternatively, the interval between the convex portions 81 of the lens plate 80 may be further spaced apart, thereby reducing interference between stereoscopic images.

Figure 16:
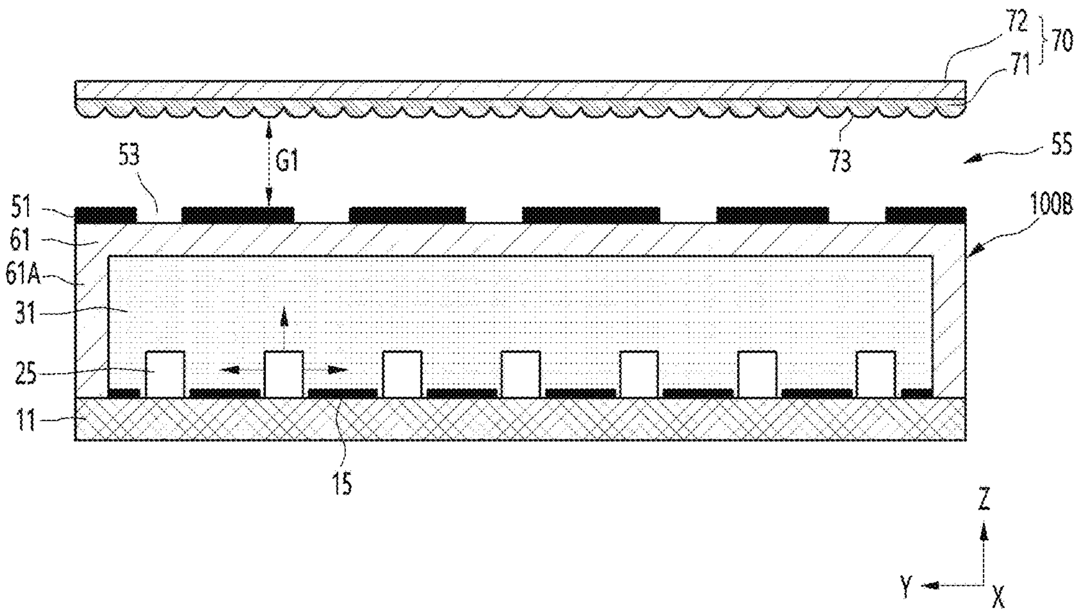
FIG. 16 is a first modified example of a lighting module in the lighting apparatus according to the first and second embodiments of the invention.
Figure 17:
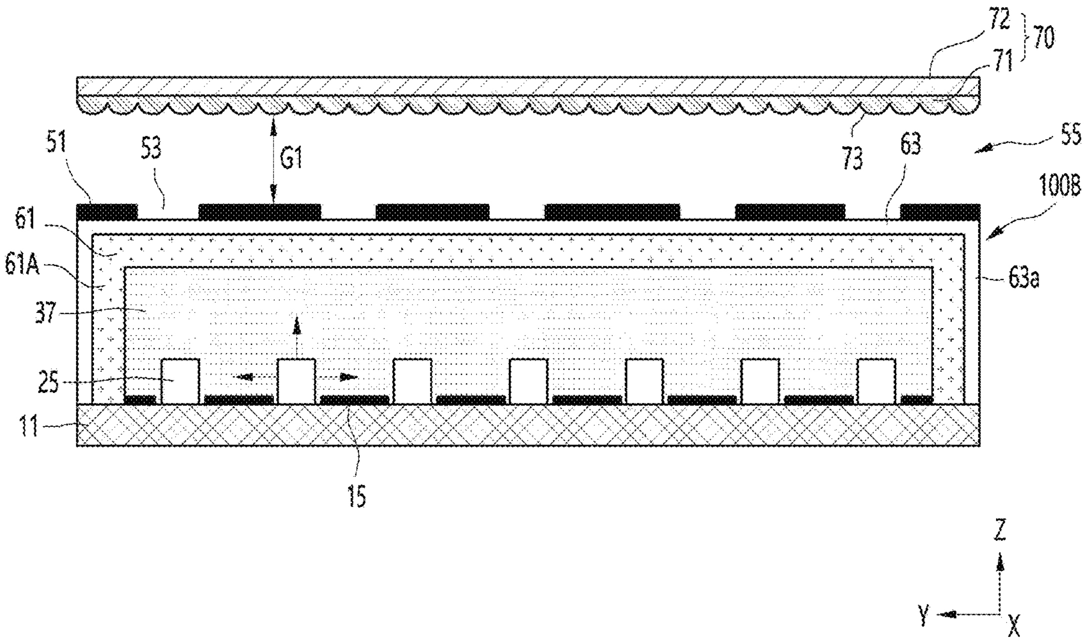
FIG. 17 is a second modified example of a lighting module in the lighting apparatus according to the first and second embodiments of the invention.

FIGS. 16 and 17 are first and second modified examples of the lighting module in the lighting device of the invention, and the same parts as those described above are omitted and may be selectively applied. As shown in FIG. 16, the lighting module 100B may include a substrate 11, a resin layer 31, a light source 25, and a first light transmitting layer 61. The light source 25 may be provided in the form of an LED chip or a package, for example, may be disposed in the form of a flip chip. The resin layer 31 may cover or seal the light source 25. The reflective layer 15 may be disposed on the resin layer 31 and the substrate 11. The resin layer 31 may be formed of a transparent resin material, and may be in close contact with the substrate 11 and the reflective layer 15. The first light transmitting layer 61 may be disposed on an upper surface and a side surface of the resin layer 31. The first light transmitting layer 61 may be provided to surround the resin layer 31. The side portion 61A of the first light transmitting layer 61 may extend outside the resin layer 31 and may contact the reflective layer 15 and/or the substrate 11. A diffusing agent may be added to the resin layer 31, and the first light transmitting layer 61 may have at least one of phosphor and ink particles, or include both. For the phosphor or ink particle, reference will be made to the description disclosed above. The light blocking layer 51 may have an opening portion 53 and be disposed on the first light transmitting layer 61. The first light transmitting layer 61 may be formed of a resin material such as silicone or epoxy. The lens plate 70 may selectively apply the embodiment or modified example disclosed above, and the convex portion 71 may be disposed on one surface or the other surface of the light transmitting portion 72. As shown in FIG. 17, a plurality of light transmitting layers 61 and 63 may be disposed on the resin layer 31 of the lighting module. The light transmitting layers 61 and 63 may include a first light transmitting layer 61 disposed on the surface of the resin layer 31 and a second light transmitting layer 63 disposed on the surface of the first light transmitting layer 61. The first light transmitting layer 61 may be disposed on an upper surface and a side surface of the resin layer 31. For example, the side portion 61A of the first light transmitting layer 61 may extend to the lower end of the side surface of the resin layer 31. The side portion 63A of the second light transmitting layer 63 may be disposed outside the side portion 61A of the first light transmitting layer 61. The side portion 61A of the first light transmitting layer 61 and the side portion 63A of the second light transmitting layer 63 may be adhered to the substrate 11. The first light transmitting layer 61 may be a layer having a phosphor. The second light transmitting layer 63 may be a layer having ink particles. The resin layer 31 may be provided as a layer without a diffusion agent or impurities. The first light transmitting layer 61 and the second light transmitting layer 63 may be formed of a resin material such as silicone or epoxy. By laminating a plurality of layers of a resin material on the outside of the resin layer 31, the light source 25 may be protected from moisture.

Third Embodiment

Figure 18:
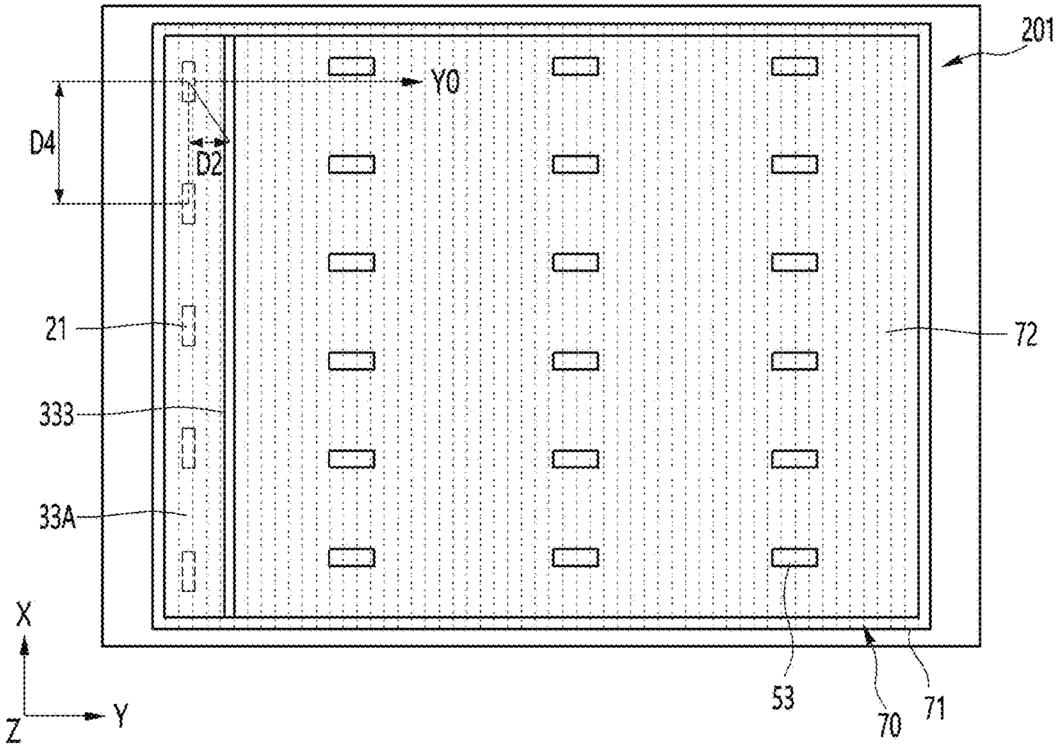
FIG. 18 is an example of a plan view of a lighting device according to a third embodiment of the invention.
Figure 19:
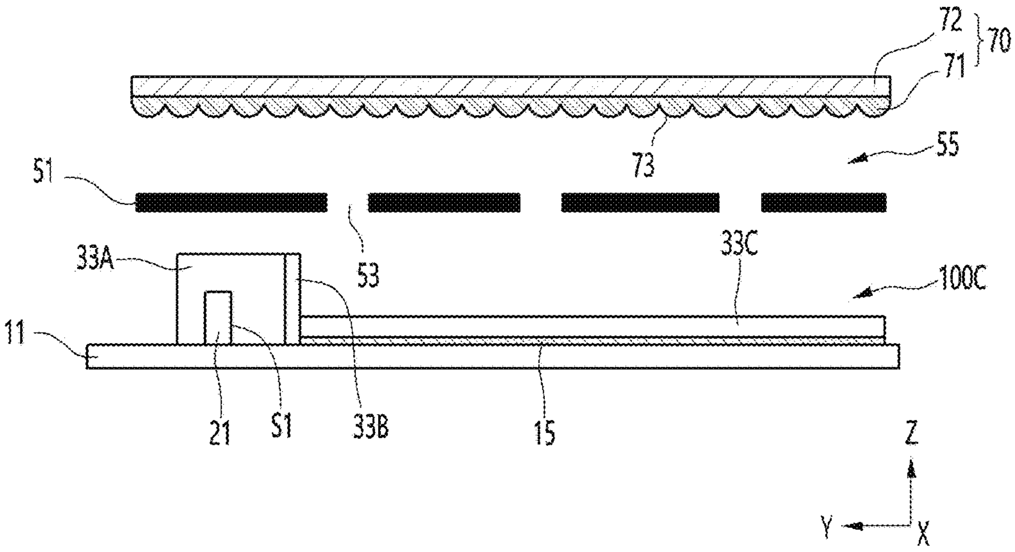
FIG. 19 is an example of a cross-sectional side view of the lighting device of FIG. 18.

FIG. 18 is an example of a plan view of a lighting device according to a third embodiment of the invention, and FIG. 19 is an example of a cross-sectional side view of the lighting device of FIG. 18. The same parts as those described above are omitted and may be selectively applied. As shown in FIGS. 18 and 19, the lighting device 201 may include a lighting module 100C and a lens plate 70 on the lighting module 100C. The lighting module 100C may include a light blocking layer 51, or the light blocking layer 51 may be disposed between the lighting module 100C and the lens plate 70. The lighting module 100C may include a light source 21 disposed on a substrate 11, a first light transmitting layer 33C, and a resin layer 33A covering the light source 21. The light source 21 may be a package that emits light in one direction or in the direction of the first light transmitting layer 33C, for example, a side-view type package. As another example, the light source 21 may include an LED chip. The resin layer 33A may cover the light sources 21 and may be spaced apart from the first light transmitting layer 33C. As shown in FIG. 18, the interval D4 between the light sources 21 may be greater than the interval D2 between the straight line connecting the light sources 21 and the incident surface of the first light transmitting layer (33C of FIG. 19). The resin layer 33A may cover an upper surface, a front surface (e.g., an emission surface), and a rear surface of the light source 21, and may be disposed at a height higher than the upper surface of the light source 21. The resin layer 33A may be formed of a resin material such as silicone or epoxy. The resin layer 33A and the first light transmitting layer 33C may overlap the light source 21 in the first direction Y. The first light transmitting layer 33C is disposed on the substrate 11, guides the light incident through the resin layer 33A, and is emitted toward the light blocking layer 51. The first light transmitting layer 33C may provide surface lighting through the upper surface. The reflective layer 15 is disposed between the first light transmitting layer 33C and the substrate 11 and may reflect incident light. The reflective layer 15 may be spaced apart from the resin layer 33A or may be in contact with the resin layer 33A. An upper surface of the first light transmitting layer 33C may be disposed lower than an upper surface of the resin layer 33A. The adhesive layer 33B is disposed between the resin layer 33A and the first light transmitting layer 33C, and may reduce light loss at the interface between the resin layer 33A and the first light transmitting layer 33C. The adhesive layer 33B may include a resin material such as silicone or epoxy, and may adhere the resin layer 33A and the first light transmitting layer 33C. The light blocking layer 51 may be disposed on the resin layer 33A and the first light transmitting layer 33C. The light blocking layer 51 may be adhered to a separate second light transmitting layer or implemented as a member having a thick thickness. A point light source having a uniform intensity passing through the opening portion 53 may be incident to the lens plate 70, and the point light source may be illuminated by stereoscopic illumination or a stereoscopic image through the convex portion 71.

Fourth Embodiment

Figure 20:
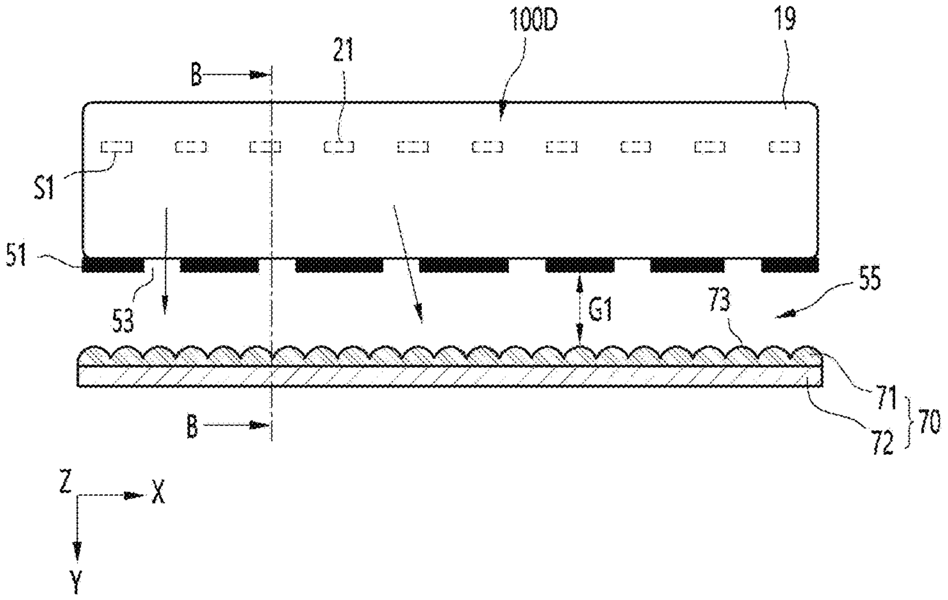
FIG. 20 is an example of a plan view of a lighting device according to a fourth embodiment of the invention.
Figure 21:
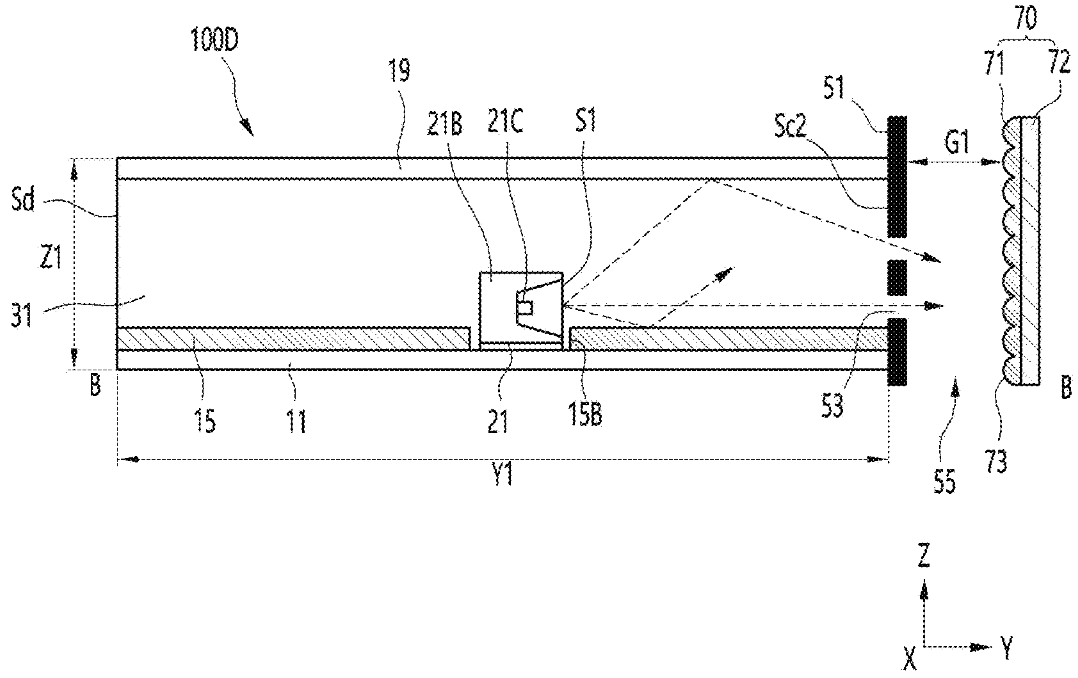
FIG. 21 is an example of a cross-sectional side view of the lighting device of FIG. 20.

FIG. 20 is an example of a plan view of a lighting device according to a fourth embodiment of the invention, and FIG. 21 is an example of a side cross-sectional view of the lighting device of FIG. 20. The same parts as those described above are omitted and may be selectively applied. Referring to FIGS. 20 and 21, the lighting device may include a lighting module 100D and a lens plate 70 on an emission side of the lighting module 100D. The lighting module 100D may include a light blocking layer 51 between the resin layer 31 and the lens plate 70. The light blocking layer 51 may be a part of the lighting module 100D or a separate member. The thickness of the lighting module 100D may be 5 mm or less, for example, in the range of 2 mm to 5 mm. The lighting module 100D may emit light having a thin line width on the emitting surface Sc2. The maximum length Y1 of the lighting module 100D or the maximum length of the resin layer 31 may be 10 mm or more, for example, in the range of 10 mm to 30 mm. The lighting module 100D may include a substrate 11, a light source 21, a resin layer 31, and first and second reflective layers 15 and 19. The lighting module 100D may include a light blocking layer 51 on the emission surface Sc2 of the resin layer 31. The first reflective layer 15 may be the reflective layer of FIG. 2, and may be disposed on the upper surface of the substrate 11, and the second reflective layer 19 may be disposed on the upper surface of the resin layer 31. The light source 21 may be sealed to the resin layer 31. The resin layer 31 may cover the light sources 21 and emit light through the front surface or the emission surface Sc2. A rear surface of the resin layer 31 is a surface opposite to the front surface, and may be spaced apart from the light source 21. The light source 21 may be implemented as a package including a body 21B and an LED chip 21C in the body 21B. The body 21B is a body made of a reflective resin material, and the LED chip 21C may be connected to the substrate 11 through a lead frame. The light source 21 may include a first surface S1 facing the emission surface Sc2 or the light blocking layer 51. The light emitted from the light source 21 may be blue, green, red, or white. As shown in FIG. 21, the light sources 21 may be disposed on the same straight line, or a straight line connecting the centers of the light sources 21 may gradually move away from one end of the lens plate 70 toward the other end. The first and second reflective layers 15 and 19 reflect light generated from the light source 21, and the reflected light or light emitted from the light source 21 may proceed to the emission surface in a line lighting along the resin layer 31. The first reflective layer 15 may include an open region 15B in which the light sources 21 are disposed. The first and second reflective layers 15 and 19 may be formed in a single-layer or multi-layer structure. The second reflective layer 19 may include a material that reflects light, for example, a metal or a non-metal material. When the second reflective layer 19 is a metal, it may include a metal layer such as stainless steel, aluminum (Al), or silver (Ag), and in the case of a non-metallic material, it may include a white resin material or a plastic material. At least one of the first and second reflective layers 15 and 19 may include a white resin material or a polyester (PET) material. At least one of the first and second reflective layers 15 and 19 may include at least one of a low reflection film, a high reflection film, a diffuse reflection film, and a regular reflection film. The light blocking layer 51 may have an opening portion 53 and may emit line lighting in the form of a point light source having uniform intensity through the opening portion 53. The light blocking layer 51 may be in contact with or spaced apart from the emission surface of the resin layer 31. The light blocking layer 51 may be in contact with or spaced apart from the first and second reflective layers 15 and 19. The vertical length of the light blocking layer 51 may be equal to or greater than a straight-line length from the lower surface of the substrate 11 to the upper surface of the second reflective layer 19. The light blocking layer 51 may cover the emission surface of the resin layer 31 and expose the opening portion 53. Each side surface of the resin layer 31 and the substrate 11 may be disposed on the same vertical plane. Each side of the resin layer 31 and the second reflective layer 19 may be disposed on the same vertical plane. The sum of the areas of the opening portions 53 in the light blocking layer 51 may be 50% or less of the area of the emission surface Sc2 of the resin layer 31, for example, in the range of 1% to 50% or 1% to 25%. When the sum of the areas of the opening portions 53 is greater than the above range, the stereoscopic effect of the opening portions 53 may be reduced. At least one of the opening portions 53 may be disposed in a region that does not overlap the light source 21 in a horizontal direction or a light emission direction. The lens plate 70 may include a light transmitting portion 72 and a convex portion 71 on one or the other surface of the light transmitting portion 72. The convex portion 71 may be, for example, disposed on one surface of the lens plate 70 or disposed on a surface corresponding to the light blocking portion.

The lens plate 70 may illuminate in a stereoscopic lighting using a point light source having a line width. The line width may be equal to or smaller than the thickness of the resin layer 31. That is, the height of the opening portion 53 may be equal to or smaller than the thickness of the resin layer 31.

Fifth Embodiment

Figure 22:
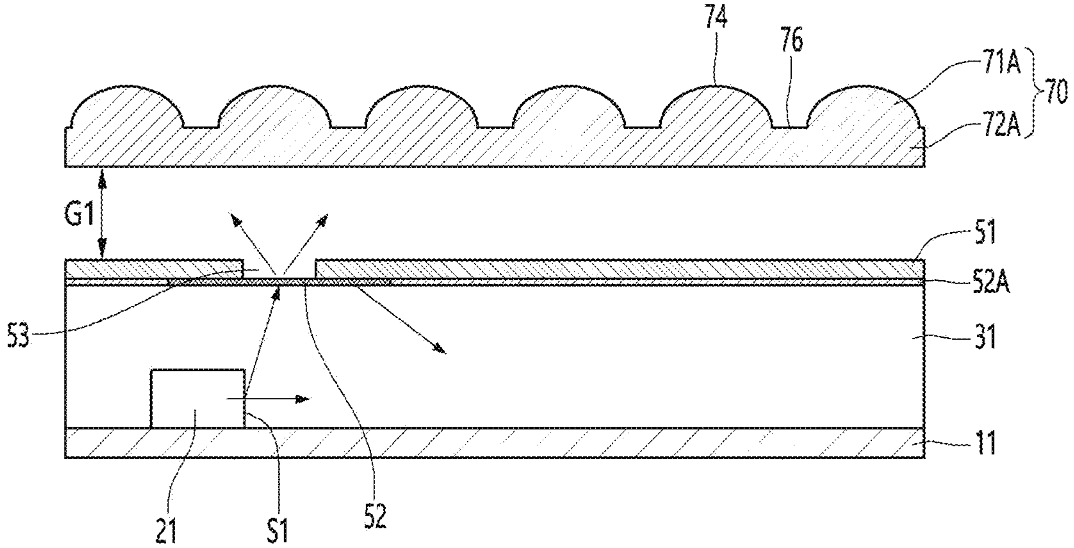
FIG. 22 is an example of a cross-sectional side view of a lighting device according to a fifth embodiment of the invention.

FIG. 22 is an example of a cross-sectional side view of a lighting device according to a fifth embodiment of the invention, and the same parts as those described above are omitted and can be selectively applied. Referring to FIG. 22, the lighting module may include a light blocking portion 52 disposed between the resin layer 31 and the light blocking layer 51. The light blocking portion 52 may be formed of a material having a reflectance of 30% or more and/or a transmittance of 80% or less. The light blocking layer 51 may be adhered to the upper surface of the resin layer 31 by an adhesive layer 52A, the adhesive layer 52A may be disposed around the light blocking portion 52, and the light blocking portion 52 may be disposed in a region overlapping the opening portion 53 of the light blocking layer 51. The light blocking portion 52 has an area larger than that of the opening portion 53 and covers the entire region of the opening portion 53. The light blocking part 52 may be disposed in a region covering the front surface (emission surface) from the rear surface of the light emitting device 21 to suppress hot spots. The light blocking part 52 may be disposed between the opening portion 53 and the resin layer 31 or between the opening portion 53 and the light emitting device 21. Accordingly, the light blocking portion 52 suppresses hot spots, and the light emitted through the light blocking portion 52 is emitted as a point light source having a more uniform intensity through the opening portion 53, and the point light source may proceed to a plurality of convex portions 71A of the lens plate 70. Accordingly, the point light source emitted from the opening portion 53 may be emitted as a stereoscopic image through the two or more convex portions 71A.

Figure 25A:
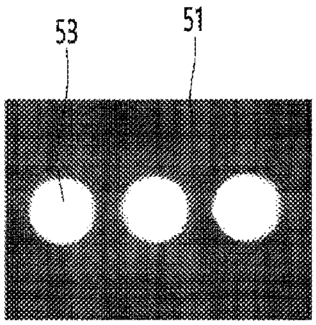
FIGS. 25A and 25B are examples of an output image of the lighting device when the shape of the opening portion is circular according to the embodiment of the invention.
Figure 25B:
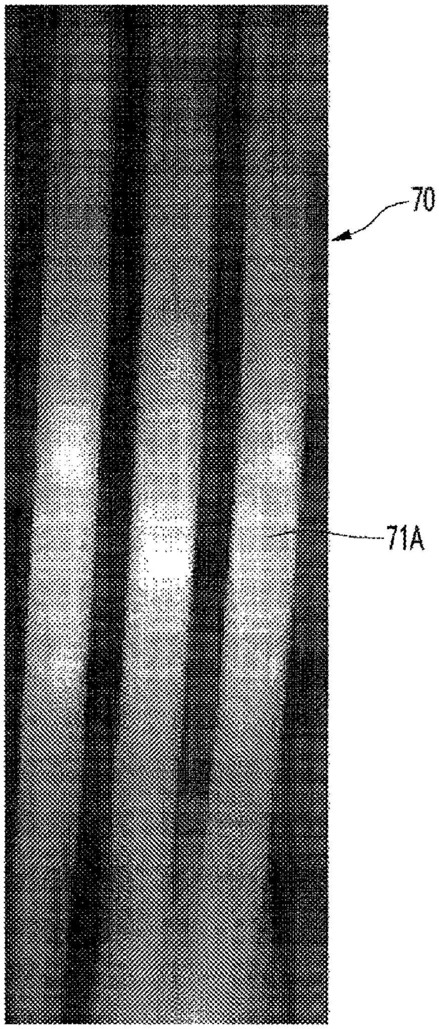
Figure 26A:
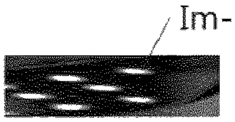
FIG. 26A to 26E are diagrams illustrating a stereoscopic surface lighting or a stereoscopic image according to a rotation angle of a lens plate in a lighting device according to an embodiment(s) of the invention.
Figure 26B:
Figure 26C:
Figure 26D:
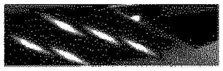
Figure 26E:
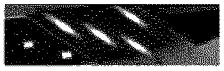
Figure 27A:
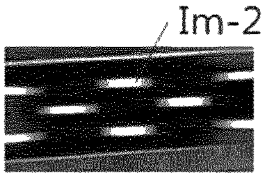
FIG. 27A to 27D are diagrams illustrating stereoscopic surface lighting or a stereoscopic image according to the tilt of the lens plate in the lighting device according to the embodiment(s) of the invention.
Figure 27B:
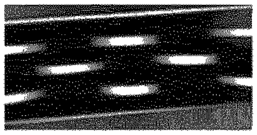
Figure 27C:
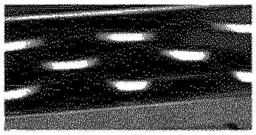
Figure 27D:
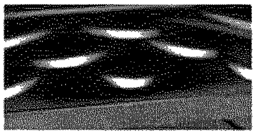

The output image of the lighting device according to the change in the shape and size of the opening portion 53 disclosed in FIG. 25A and the output image of the lighting device may be different by the change in the interval G1 between the light blocking layer 51 and the lens plate 70. Here, one region of the opening portion 53 of the light blocking layer 51 may be disposed at the shortest interval from the upper end of the light emitting device 21. The shortest interval may be less than or equal to the thickness of the resin layer 31. The position of the opening portion 53 of the light blocking layer 51 may be formed within an interval of up to 15 mm or up to 12 mm in the emission direction (Y direction, omnidirectional or horizontal direction) of the light emitting device 21 from the center of the light emitting device 21, and may be ±7.5 mm or less or 6 mm or less from the center of the light emitting device 21 in a direction (X direction, lateral direction, or vertical direction) perpendicular to the emission direction. The horizontal or vertical size of the opening portion 53 may be arranged in the range of n1×m1 to n2×m2, where the n1 and m1 may be 2 mm or more, and the n2 and m2 may be 15 mm or less. The opening portion 53 may be disposed one-to-one or many-to-one with each light emitting device 21, and the stereoscopic image may be 1:n (n is 2 or more). Accordingly, when the opening portion 53 and each light emitting device 21 are arranged one-to-one, a plurality of stereoscopic images may be implemented with the minimum number of light emitting devices 21 by using the shape of the opening portion 53 and the number of convex portions 71A, and a stereoscopic image can be realized using the minimum number of light emitting devices 21 by disposing the opening portion 53 and each light emitting device 21 in a many-to-one manner, and a number and brightness of the output image may be adjusted by adjusting the size of the opening portion 53. When only the horizontal size is changed from 2 mm×2 mm to 10 mm×2 mm in the horizontal and vertical sizes of the opening portion 53 disclosed in the above embodiment(s), the output image is also increased in the horizontal direction. In addition, when only the vertical size of the opening portion 53 is changed from 2 mm×2 mm to 2 mm×10 mm in the horizontal and vertical sizes of the opening portion 53, it may be seen that the output image also increases in the vertical direction and increases in the thickness direction. That is, when the size of the opening portion 53 increases in the same direction (horizontal direction) as the arrangement direction of the stereoscopic image, the thickness of the image increases, and when the opening portion 53 increases in the direction opposite to the arrangement direction (vertical direction), an image in the center may be displayed in a form of a straight line. Accordingly, the number of stereoscopic images may be implemented without using a separate diffusion plate or diffusion film between the light blocking layer 51 and the lens plate 70. Also, by increasing the number of opening portions, the number of stereoscopic images may be adjusted. The interval G1 between the light blocking layer 51 and the lens plate 70 is the height of the first air layer 55, and may be provided by diffusing the light emitted through the opening portion 53. An area on which light is incident on the lens plate 70 may be increased according to the interval G1, and a stereoscopic image may be output through two or three or more convex portions 71A. Here, the interval G1 may be provided in the range of 1 mm to 20 mm, and it may be seen that the output image becomes larger at the interval G1 from 0 mm to 14 mm. For example, the output image may be output in a range of 2 to 5 times or a range of 3 to 5 times the interval G1. In this case, the output image may be a region having a luminous intensity greater than or equal to an average value. The length of the stereoscopic image may be adjusted by adjusting the interval G1.

Figure 30:
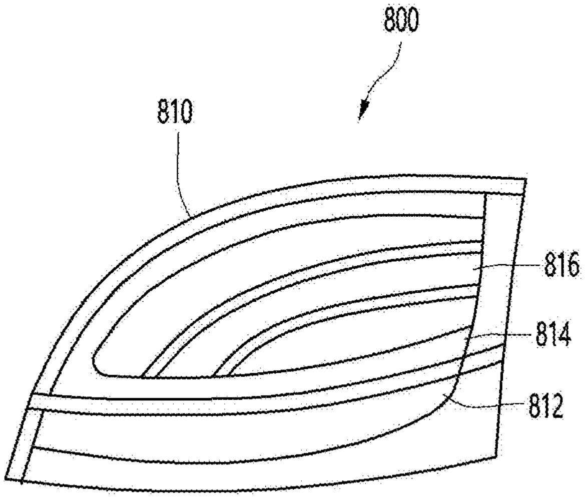
FIG. 30 is a plan view of a vehicle to which a lamp having a lighting device or a lighting module according to an embodiment of the invention is applied.
Figure 31:
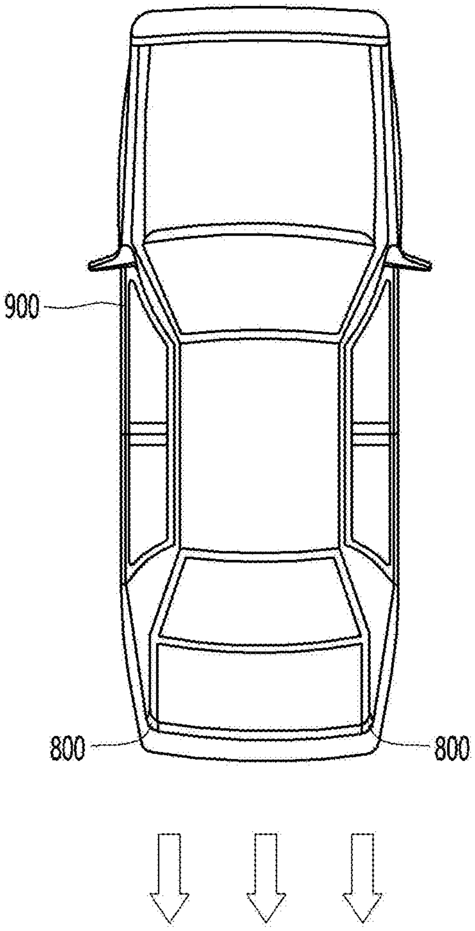
FIG. 31 is a diagram illustrating a lamp having the lighting module or lighting device of FIG. 30.

FIG. 30 is a plan view of a vehicle to which a vehicle lamp to which a lighting module is applied according to an embodiment is applied, and FIG. 31 is a view showing a vehicle lamp having a lighting module or a lighting device disclosed in the embodiment. Referring to FIGS. 30 and 31, the tail lighting 800 in the vehicle 900 may include a first lamp unit 812, a second lamp unit 814, a third lamp unit 816, and a housing 810. Here, the first lamp unit 812 may be a light source serving as a turn indicator, the second lamp unit 814 may be a light source serving as a sidelight, and the third lamp unit 816 may be a light source serving as a brake light, but is not limited thereto. At least one or all of the first to third lamp units 812, 814, and 816 may include the lighting device or module disclosed in the embodiment. The housing 810 accommodates the first to third lamp units 812, 814, and 816, and may be made of a light-transmitting material. In this case, the housing 810 may have a curve according to the design of the vehicle body, and the first to third lamp units 812, 814, and 816 may implement a surface light source that may have a curved surface according to the shape of the housing 810. Such a vehicle lamp may be applied to a turn signal lamp of a vehicle when the lamp unit is applied to a tail lamp, a brake lamp, or a turn signal lamp of a vehicle.

Features, structures, effects, etc. described in the above embodiments are included in at least one embodiment of the invention, and are not necessarily limited to only one embodiment. Furthermore, features, structures, effects, etc. illustrated in each embodiment may be combined or modified for other embodiments by those of ordinary skill in the art to which the embodiments belong. Accordingly, the contents related to such combinations and modifications should be interpreted as being included in the scope of the invention. In addition, although the embodiment has been described above, it is only an example and does not limit the invention, and those of ordinary skill in the art to which the invention pertains are exemplified above in a range that does not depart from the essential characteristics of the present embodiment. It may be seen that various modifications and applications that have not been made are possible. For example, each component specifically shown in the embodiment may be implemented by modification. And the differences related to these modifications and applications should be construed as being included in the scope of the invention defined in the appended claims.

The invention claimed is:

1. A lighting device comprising:

a substrate;

a plurality of light sources disposed on the substrate;

a resin layer covering the light sources and disposed on the substrate;

a lens plate disposed on the resin layer;

a first light transmitting layer including a diffusion agent and disposed between the resin layer and the lens plate; and a light blocking layer disposed on the first light transmitting laver, wherein the light blocking layer includes a plurality of opening portions, wherein the lens plate includes a plurality of convex portions arranged in a first direction, wherein the plurality of convex portions has a long length in a second direction orthogonal to the first direction, wherein the convex portions comprise a lenticular lens, wherein at least one of the plurality of convex portions overlaps the substrate, the resin layer, and at least one of the plurality of light sources in a direction perpendicular to an upper surface of the substrate, wherein light passing through the lens plate is illuminated as a stereoscopic image, wherein the stereoscopic image provides as a long image in a direction perpendicular to a length direction of each of the convex portions based on a center of each of the opening portions, wherein the plurality of light sources is arranged in the second direction and emits toward the first direction, and wherein a brightness of the stereoscopic image gradually decreases as a region gets farther from the center of each of the opening portions.

2. The lighting device of claim 1, comprising:

a first air layer disposed between the first light transmitting layer and the lens plate.

3. The lighting device of claim 1, comprising:

a second light transmitting layer disposed between the first light transmitting layer and the lens plate, wherein the second light transmitting layers includes a diffusion agent.

4. The lighting device of claim 3, comprising:

a first air layer between the first light transmitting layer and the lens plate; and a second air layer disposed between the second light transmitting layer and the lens plate.

5. The lighting device of claim 1, wherein a first interval between the resin layer and the lens plate is in a range of 5 mm to 50 mm.

6. The lighting device of claim 1, wherein the plurality of convex portions is disposed on a lower surface or an upper surface of the lens plate.

7. The lighting device of claim 1, comprising:

a reflective layer disposed between the substrate and the resin layer and having a plurality of open regions, wherein each of the plurality of light sources is disposed through each of the open regions.

8. The lighting device of claim 1, wherein each of the plurality of convex portions has one of a hemispherical shape, a semi-elliptical shape, or a polygonal shape.

9. The lighting device of claim 1, wherein each of the plurality of light sources is a side view type package having an LED chip.

10. The lighting device of claim 1, wherein the first light transmitting layer disposed on at least one of an upper surface and side surfaces of the resin layer, and further comprising a second light transmitting layer disposed on at least one of an upper surface and side surfaces of the first light transmitting layer.

11. The lighting device of claim 1, wherein the first light transmitting layer includes at least one of a phosphor and ink particles.

12. The lighting device of claim 1, wherein each of the plurality of convex portions has a length substantially equal to a length of the lens plate in the second direction perpendicular to the first direction, and wherein light emitted from the light sources is exited as a plurality of images through the plurality of opening portions and the lens plate.

13. The lighting device of claim 1, wherein an interval between adjacent opening portions is greater than a length of at least one of the opening portions.

14. The lighting device of claim 1, wherein the plurality of opening portions does not overlap with the plurality of light sources in a vertical direction orthogonal to the first and second directions.

* * * * *